(12) United States Patent
Hakka et al.

(10) Patent No.: US 7,056,482 B2
(45) Date of Patent: Jun. 6, 2006

(54) METHOD FOR RECOVERY OF $CO_2$ FROM GAS STREAMS

(75) Inventors: Leo E. Hakka, Dollard des Orueaux (CA); Michel A. Ouimet, Montreal (CA)

(73) Assignee: Cansolv Technologies Inc., Montreal (CA)

( * ) Notice: Subject to any disclaimer, the term of this patent is extended or adjusted under 35 U.S.C. 154(b) by 187 days.

(21) Appl. No.: 10/459,519

(22) Filed: Jun. 12, 2003

(65) Prior Publication Data

US 2004/0253159 A1 Dec. 16, 2004

(51) Int. Cl.
*C01B 17/16* (2006.01)

(52) U.S. Cl. .................. 423/230; 423/228; 423/242.7
(58) Field of Classification Search ............. 423/228, 423/230, 242.7
See application file for complete search history.

(56) References Cited

U.S. PATENT DOCUMENTS

| | | | |
|---|---|---|---|
| 4,211,761 A | * | 7/1980 | Tung .................. 423/539 |
| 4,336,233 A | | 6/1982 | Appl et al. |
| 4,624,838 A | | 11/1986 | Pan et al. |
| 5,017,350 A | * | 5/1991 | Hakka et al. ............ 423/242.7 |
| 5,019,361 A | * | 5/1991 | Hakka .................. 423/242.7 |
| 5,061,465 A | | 10/1991 | Carter |
| 5,744,110 A | | 4/1998 | Mimura et al. |
| 6,036,931 A | | 3/2000 | Yoshida et al. |
| 6,165,433 A | | 12/2000 | Chakravarti et al. |
| 6,337,059 B1 | | 1/2002 | Schubert et al. |
| 6,582,498 B1 | | 6/2003 | Barnes, Jr. et al. |

FOREIGN PATENT DOCUMENTS

| | | |
|---|---|---|
| EP | 1 016 445 | 7/2000 |
| WO | WO 02/09849 | 2/2002 |
| WO | WO 03/013701 | 2/2003 |

OTHER PUBLICATIONS

D. L. Heguy and G. J. Nagl, Consider optimized iron–redox processes to remove sulfur, Gas Processing Developments Special Report, Hydrocarbon Processing, Jan. 2003, p. 53–57, Schaumburg, Illinois.

P. C. Rooney, M. S. DuPart and T. R. Bacon, Oxygen's role in alkanolamine degradation, Process Technology, Hyrdocarbon Processing, Jul. 1998, p. 109–113, Freeport, Texas.

Gary T. Rochelle, George S. Goff, Tim Cullinane, and Stefano Freguia, Research Results for $CO_2$ Capture from Flue Gas by Aqueous Absorption/Stripping, presented at the Laurance Reid Gas Conditioning Conference, Department of Chemical Engineering, The University of Texas at Austin, Feb. 25–27, 2002, p. 131–151, Austin, TexasM.

M. Simmonds, P. Hurst, M.B. Wilkinson, C. Watt and C.A. Roberts, a Study of Very Large Scale Post Combustion $CO_2$ Capture at a Refining & Petrochemical Complex, p. 1–8, United Kingdom, no date.

George S. Goff and Gary T. Rochelle, Department of Chemical Engineering, The University at Austin, Austin, Texas, no date.

A. Chakma and A. Meisen, Department of Chemical Engineering, The University of British Columbia, Proc. 35th Canadian Chemical Engineering Conference, Calgary, Alberta, Canada, 1985, vol. 1: p. 37–41, no month.

Amitabha Chakma and Axel Meisen, Department of Chemical Engineering, The University of British Columbia, Solubility of $CO_2$ In Aqueous Methyldiethanolamine and N, N–Bis (hydroxyethyl) piperazine Solutions, Vancouver, British Columbia, Canada, Reprinted from I & EC Research, 1987, 26, 2461. Copyright 1987 by the American Chemical Society and reprinted by permission of the copyright owner, first page, no month.

M. Slater, E. West and C. L. Mariz, Carbon Dioxide Capture from Multiple Flue Gas Sources, United Kingdom and U.S.A., no date.

IEA Greenhouse Gas R & D Programme, CRE, Stoke Orchard, Carbon Dioxide Capture from Power Stations, Absourbtion Technologies, p. 8, Gloucestershire, United Kingdom, no date.

M. Wilson, P. Tontiwachwuthikul, A. Chakma, R. Idem, A. Veawab, A. Aroonwilas, D. Gelowitz, J. Barrie, C. Mariz, Test Results from a $CO_2$ Extraction Pilot Plant at Boundary Dam Coal–Fired Power Station, Canada and U.S.A., no date.

* cited by examiner

*Primary Examiner*—Edward M. Johnson
(74) *Attorney, Agent, or Firm*—Philip C. Mendes do Costa; Bereskin & Parr

(57) ABSTRACT

A process for recovering $CO_2$ from a feed gas stream comprises treating the feed gas stream with a regenerated absorbent comprising at least one tertiary amine absorbent having a $pK_a$ for the amino function of from about 6.5 to about 9 in the presence of an oxidation inhibitor to obtain a $CO_2$ rich stream and subsequently treating the $CO_2$ rich stream to obtain the regenerated absorbent and a $CO_2$ rich product stream. The feed gas stream may also include $SO_2$ and/or $NO_x$.

44 Claims, 3 Drawing Sheets

METHOD FOR RECOVERY OF $CO_2$ FROM GAS STREAMS

FIELD OF THE INVENTION

The present invention relates to a process for the capture of $CO_2$ from gas streams which may also contain nitrogen oxides and/or sulfur oxides. The process may also provide for the simultaneous or sequential removal of other acidic contaminants and even particulate material. In one aspect, the process provides for the simultaneous or sequential removal of carbon dioxide and nitrogen oxides (NO and $NO_2$). In another aspect, the process provides for the simultaneous or sequential removal of carbon dioxide and sulfur oxides ($SO_2$ and $SO_3$). In another aspect, the process provides for the removal of carbon dioxide, nitrogen oxides (NO and $NO_2$) and sulfur oxides ($SO_2$ and $SO_3$). The gas stream may be a waste gas streams, such as flue gas streams, kiln gases, reverberatory furnace gases, fluidized catalytic cracker (FCC) catalyst regenerator tail gases and the like.

BACKGROUND OF THE INVENTION

Carbon dioxide is a useful chemical for enhanced oil recovery by means of injecting it into an oil reservoir where it tends to dissolve into the oil in place, thereby reducing its viscosity and thus making it more mobile for movement toward the producing well. Other commercial uses of $CO_2$ are as carbonation in beverages, a mild acidification chemical and as a cooling agent in the form of a liquid or a solid (i.e. "dry ice").

Emissions of $CO_2$ into the atmosphere are thought to be harmful due to its "greenhouse gas" property contributing to global warming. The major source of anthropogenic $CO_2$ is the combustion of fossil fuels. The largest sources of $CO_2$ emissions are coal combustion for electricity generation, the use of coke for steelmaking and the use of petroleum products as a transportation and heating fuel. Other sources are natural gas fired electrical generating stations, industrial boilers for generating steam and for co-generating steam and electricity, the tail gas from fluidized catalytic cracking unit regenerators and the combustion of petroleum coke as a fuel. Gas streams emitted from such facilities may contain a significant amount of $CO_2$, which could be recovered and used in other industrial processes.

By way of example, flue gas from coal fired thermal generating stations or steam boilers is a plentiful source of $CO_2$ suitable for capture, often containing about 12% $CO_2$ by volume. The flue gas usually also contains residual oxygen (2–5% volume), nitrogen and sulfur oxides and particulate matter ("fly ash"). NO is produced during the combustion process by reaction of the nitrogen content of the fuel with oxygen and also by the oxidation of the nitrogen of the combustion air at the high combustion temperature. The NO may then be partially oxidized to $NO_2$ by the residual $O_2$ in the flue gas. The extent of this reaction is usually quite small, so that the $NO/NO_2$ ratio in most of the waste gas streams discussed previously herein is quite large, and particularly so in flue gas. Most coal derived flue gases also contain sulfur oxides, principally $SO_2$, with a much lesser amount of $SO_3$. The $SO_3$ will react with water vapor present in the flue gas to form sulfuric acid ($H_2SO_4$) at temperatures below about 339° C. and will then condense into fine droplets ("acid mist") as the flue gas cools. Further, other acidic contaminants, such as hydrogen chloride and hydrofluoric acid, may also be present in some flue gas streams. Solid contaminants such as FCC catalyst fines, unburned carbon or metal oxides are also often present in some flue gases.

The emission of all of these minor contaminants is generally regulated in order to preserve air quality and prevent acid rain and smog. Often, a process for the capture of $CO_2$ also aids in controlling the regulated pollutants. Processes have been developed and are in use to capture $CO_2$ and/or to purify gas streams to the levels regulated by government.

Many processes have been developed for the capture of $CO_2$ from gas streams, including polymer and inorganic membrane permeation, removal by adsorbents such as molecular sieves, cryogenic separation, scrubbing with a solvent that is chemically reactive with $CO_2$ and/or a physical solvent. The removal of $CO_2$ from flue gas imposes requirements, which limit the choice of practicable processes to only a few. The operating conditions which have limited the current choice in selecting a commercial process include: (1) the low partial pressure of $CO_2$ (e.g., that of 12 vol. % $CO_2$ in flue gas at atmospheric pressure, or about 90 mm Hg $CO_2$ pressure), (2) the presence of oxygen in the gas, which can cause oxidative degradation of the solvent, (3) the large flow rates of gas which require very low volatility of the solvent to minimize losses into the treated gas, and (4) a need for low energy consumption by the process. Additionally, any proposed process requires low capital and operating costs, be safe and environmentally friendly and must also be robust and easily operable.

One of the most successful commercial process for $CO_2$ removal from flue gas is the use aqueous monoethanolamine (MEA) as the solvent in an absorption/stripping type of regenerative process. This process is being used commercially for $CO_2$ capture from coal fired power plants and gas turbines. Several deficiencies inherent to the MEA absorbent have however prevented wider adoption of the technology. First, the energy consumption of the process is quite high. The MEA process may consume 10–30% of the steam generated in a boiler heated by combustion of a fossil fuel, depending on the configuration and energy integration.

Secondly, oxidation of the MEA absorbent acidifies the solvent, making it corrosive in addition to causing a loss in available alkalinity for $CO_2$ capture. In particular, the oxidation of the MEA causes formation of ammonia and various organic acids as byproducts. The organic acid byproducts are very corrosive, requiring the use of corrosion resistant materials of construction and/or corrosion inhibitors.

Thirdly, any strong acid impurities in the flue gas will react with and deactivate the MEA preventing or limiting further absorption. Typically, the feed stream to an MEA $CO_2$ capture process contains relatively high levels of strong acids such as sulfur dioxide ($SO_2$), sulfuric acid mist, hydrogen chloride and $NO_2$ which will neutralize the alkalinity of MEA. Thus either only relatively clean gas streams can be utilized or a pretreatment process is required. Accordingly, a removal step for these strong acids upstream of the $CO_2$ absorption step or a means of removing these acids from the MEA solution, where they form so-called heat stable amine salts (HSAS), is required for typical flue gases since they contain a substantial amount of these components. These acidic contaminants, including $SO_2$, $NO_2$, sulfuric acid and HCl are typically captured before the $CO_2$ capture from the gas stream by contact with an alkaline liquid in which they are readily soluble. Examples of stoichiometric or irreversible reactants which may be used upstream of a MEA adsorption/stripping process are water solutions or slurries of caustic, soda ash (sodium carbonate), lime and limestone. Regenerable or equilibrium absorbents comprising amine solutions can be practiced for $SO_2$ removal if it is desired to recover the $SO_2$ as a concentrated usable byproduct.

Fourthly, MEA has a relatively high vapor pressure resulting in physical equilibrium losses of MEA into the treated gas. MEA vapor pressure over a 30% aqueous solution at a scrubbing temperature of 60° C. is approximately 0.2 mm Hg while the vapor pressure of pure MEA at 120° C. regeneration temperature is 120 mm Hg. Unless measures are taken to wash the MEA out of the treated gas, the treated gas may contain about 260 ppmv of MEA, which is unacceptable from both an economic and pollution point of view. Thus the gas must be treated for recovery of the MEA by, e.g., a water wash after the contact with the MEA solution for $CO_2$ capture.

Fifthly, the thermal and chemical degradation of MEA due to reaction between MEA and $CO_2$ and thermal degradation of MEA can render the MEA unsuitable for continued use thus requiring the use of substantial amounts of fresh make up absorbent.

Particulate matter, if present, is also usually removed upstream of the MEA absorber, by means such as cyclones, spray scrubbers, venturi scrubbers, baghouse filters and wet or dry electrostatic precipitators. The choice of particulate removal process is made on the basis of economics and the size, quantity and nature of the dust.

Sixthly, flue gases generally also contain nitrogen oxides, $NO_x$, mainly nitric oxide, NO, and a minor proportion of nitrogen dioxide, $NO_2$. Since these are responsible for smog, it is desirable to remove them also. MEA scrubbing for $CO_2$ captures some $NO_2$ but does not remove the major NO component.

The emission of $NO_x$ can be controlled by a variety of means, differing in cost and effectiveness. Combustion modifications, such as low-$NO_x$ burners, overfire air and flue gas recirculation are inexpensive but generally are incapable of greater than about 50–60% $NO_x$ reduction. Selective noncatalytic reduction (SNCR), consisting of injecting a reactant such as ammonia or urea into hot flue gas, is somewhat more expensive but is generally not capable of $NO_x$ reduction exceeding 70%. Selective catalytic reduction (SCR) requires temperatures in the 300–400° C. range and can achieve over 90% NO reduction. However, SCR is quite expensive and can be adversely affected by other contaminants in the feed gas, which deactivate the catalyst. Adsorption processes have been proposed for $NO_x$ removal but have not found commercial acceptance due to poor cost-effectiveness and a high degree of process complexity.

Wet scrubbing processes for NO removal are known in the art. Nitric oxide is sparsely soluble in water and other solvents and it is not acidic, precluding effective scrubbing with alkaline solutions. Two principal stratagems have been used to overcome the low solubility problem. One means is oxidation of NO to $NO_2$ or higher oxides such as $N_2O_5$, which are water soluble, by a variety of agents such as ozone, chlorine dioxide ($ClO_2$) and potassium permanganate ($KMnO_4$), usually followed by alkaline scrubbing. These processes can be highly effective, but the operating cost of these processes is generally high due to the stoichiometric consumption of expensive oxidizing agent fed to the process or generated in situ, as in the use of corona discharge in $O_2$ containing gases to produce ozone, $O_3$. Furthermore, the oxidation step and the absorption of the products into an alkali solution usually necessitates two separate pieces of equipment in the gas flow, since the oxidation and alkaline absorption are preferably practiced as separate steps.

A second means of increasing NO solubility in aqueous systems is to add a metal chelate compound which is capable of binding to NO. For instance, the use of limestone or lime slurry containing an Fe, Cu, Zn, Co, or Ni complex with ethylenediamine tetraacetic acid (EDTA) or nitrilotriacetic acid (NTA) is claimed to remove >90% $SO_2$ and ~70% NO (Japan Kokai, JP 53090181 780808, Akiyama, I., Okiura, K., Ota, M., Takahashi, Y. and Tahara, H.). Many publications and patents report the use of the ethylenediaminetetraacetic acid (EDTA) and its salts such as the disodium ($Na_2EDTA$) or tetrasodium salt ($Na_4EDTA$) as the preferred chelating agent and ferrous iron ($Fe^{II}$) as the preferred metal (U.S. Pat. No. 5,891,408, Buisman et al., U.S. Pat. No. 5,785,841, Tseng, and U.S. Pat. No. 5,695,727, College et al.).

The simultaneous removal of $SO_2$ and $NO_x$ is described in a co-pending patent application, U.S. patent application Ser. No. 10/211,514; Hakka and Ouimet, the disclosure of which is incorporated herein by reference. In that process, a method of removing NO from a gas stream is disclosed. The method comprises (a) reacting NO with an absorbent to form an absorbent solution containing a nitrosyl complex at a pH from about 5 to about 7; (b) reacting the nitrosyl complex with a reduced sulfur reagent to produce recoverable reaction products containing nitrogen and/or sulfur atoms and to regenerate the absorbent whereby a regenerated absorbent solution is formed; and, (c) separating recoverable reaction products from the regenerated absorbent solution. The nitrosyl complex is preferably an iron nitrosyl complex. Preferably, the absorbent is selected from the group consisting of an iron amine polycarboxylic acid complex, an iron nitrilotriacetic acid complex, an iron hydroxyethyl ethylenediaminetriacetic acid complex and an iron diethylenetriaminepentaacetic acid complex.

Feed to $SO_x/NO_x$ removal process is normally pretreated to remove particulate materials, including sulfuric acid mist, by various standard methods such as dry electrostatic precipitators, wet electrostatic precipitators, baghouses, lime injection into the gas stream for acid mist capture, water spray scrubbers and venturi scrubbers.

SUMMARY OF THE INVENTION

In accordance with one aspect of this invention, there is provided a process for recovering $CO_2$ from a feed gas stream comprising treating the feed gas stream with a regenerated absorbent comprising at least one tertiary amine absorbent having a $pK_a$ for the amino function of from about 6.5 to about 9 in the presence of an oxidation inhibitor to obtain a $CO_2$ rich stream and subsequently treating the $CO_2$ rich stream to obtain the regenerated absorbent and a $CO_2$ rich product stream.

One advantage of the instant invention is the enhanced energy efficiency of the process. The use of the novel absorbents disclosed herein results in a reduction of the energy consumption of the chemical solvent $CO_2$ capture process. In the process, $CO_2$ is first absorbed in a $CO_2$ lean absorbent to produce a $CO_2$ rich absorbent. The $CO_2$ rich absorbent is then subjected to a heat treatment step, preferably steam stripping, to regenerate the lean $CO_2$ absorbent.

The energy requirement of a regenerable chemical absorbent $CO_2$ capture process is mainly for heat to perform the regeneration of the $CO_2$ lean solvent. The energy used by the regeneration step is consumed in:

1. reversing the exothermic absorption reaction, including the heat of condensation of $CO_2$ from the gas phase into solution in the liquid phase;

2. generating stripping steam to carry off overhead from the regeneration column the $CO_2$ evolved from the liquid phase into the gas phase;
3. providing the sensible heat for warming the $CO_2$ rich absorbent to regeneration temperature; and,
4. providing heat to make up for heat losses from the regeneration column and associated equipment.

Any process known in the art for performing these steps may be used. Steam stripping in a stripping column is a particularly preferred method.

The first two items usually account for the majority of the total heat requirement and both are related to the heat of reaction between the absorbent and $CO_2$. The energy required for desorbing the $CO_2$ is equal to the heat of reaction in the absorption step. Generally, the heat of reaction is higher with stronger bases. Base strength of an alkali can be expresses as its $pK_a$ value, which is equal to the negative logarithm of the equilibrium constant for the reversible ionization of the base's conjugate acid (Reaction 1) at standard conditions of unit activity for the species involved:

$$BH^+ \Rightarrow B + H^+$$

$$K_a = [B][H^+]/[BH^+]$$

$$pK_a = -\log_{10} K_a \quad (1)$$

The pKa is numerically equal to the solution pH at which the concentration of the free base and conjugate acid are equal. The stronger the base, the higher the heat of reaction with $CO_2$. On the other hand, in order to absorb $CO_2$, the base must be strong enough to buffer in the pH range produced by $CO_2$ ionization (Reactions 2 and 3).

$$CO_2 + H_2O \Rightarrow \text{"}H_2CO_3\text{"} \quad (2)$$

$$\text{"}H_2CO_3\text{"} \Rightarrow H_+ + HCO_3^- \quad (3)$$

$$\text{Net Reaction } CO_2 + H_2O \Rightarrow H^+ + HCO_3^- \quad (4)$$

The $pK_a$ of the hypothetical carbonic acid, "$H_2CO_3$", is 6.4 at 25° C. Carbonic acid is so unstable towards the ions that it has not been unequivocally observed as such; $CO_2$ is called the anhydride of carbonic acid. The bicarbonate ion, $HCO_3^-$, can further ionize to the carbonate ion, $CO_3^=$, and a proton, $H^+$, but the $pK_a$ is 10.25 which would require pH values outside the operating range of a $CO_2$ scrubbing process. In a practical $CO_2$ capture process, an alkali (represented as B in Reaction 5) is added to the scrubbing liquid in order to react with the protons formed by the absorption of $CO_2$, thereby driving Reaction 4 to the right and increasing the concentration of $CO_2$ in the solvent:

$$CO_2 + H_2O + B \Rightarrow BH^+ + HCO_3^- \quad (5)$$

The stronger the base B, the higher the heat of reaction and the farther the point of equilibrium for Reaction 5 is moved to the right. However, this also means that the reaction is more difficult to reverse due to the lower vapor pressure of $CO_2$. The lower vapor pressure of $CO_2$ requires that more steam must be used to regenerate the absorbent and produce the stream of $CO_2$, and steam which is carried off overhead to an overhead condenser where most of the steam condenses and is sent back into the regeneration tower as reflux. Further, more energy must be supplied to produce the additional steam required to reverse the heat of Reaction 5.

MEA has a $pK_a$ of 9.5 at 25° C. In order to reduce the energy requirement of $CO_2$ capture, a weaker base must be used as the buffering agent (mixture of absorbents) in order to reduce the heat of reaction and the stripping steam requirement. A very weak buffering agent will result in such a low concentration of absorbed $CO_2$ per volume of solvent (absorbent) that it results in a higher specific energy consumption (kg steam used/kg of $CO_2$ captured and liberated from the absorbent) due to the growing proportion of sensible heat losses and a high amount of stripping steam per amount of $CO_2$. We have surprisingly found that buffers in the $pK_a$ range of about 6.5 to 8.5 result in a process with the least specific energy consumption. Suitable buffers having $pK_a$'s in this range are listed in Table 1.

In one embodiment, the process further comprises selecting the at least one tertiary amine absorbent from the group consisting of methyldiethanolamine, triethanolamine, N,N'-di-(hydroxyalkyl)piperazine, N,N,N',N'-tetrakis (hydroxyalkyl)-1,6-hexanediamine, tertiary alkylamine sulfonic acids and mixtures thereof.

In another embodiment, the process further comprises selecting the at least one tertiary amine absorbent from the group consisting of methydiethanolamine, N,N'-di-(2-hydroxyethyl)piperazine, N,N'-di-(3-hydroxypropyl) piperazine, N,N,N',N'-tetrakis(2-hydroxyethly)-1,6-hexanediamine, N,N,N',N'-tetrakis(2-hydroxypropyl)-1,6-hexanediamine, tertiary alkylamine sulfonic acids, triethanolamine, and mixtures thereof. Preferably, the tertiary alkylamine sulfonic acid is selected from the group consisting of 4-(2-hydroxyethyl)-1-piperazineethanesulfonic acid, 4-(2-hydroxyethyl)-1-piperazinepropanesulfonic acid, 4-(2-hydroxyethyl)-1-piperazinebutanesulfonic acid, 4-(2-hydroxyethyl) piperazine-1-(2-hydroxypropanesulfonic acid), 1,4-piperazinedi(ethanesulfonic acid) and mixtures thereof.

Another advantage of the instant invention is that the tertiary amines have a high $CO_2$ sorption capacity. Tertiary amines have a higher absorbing capacity in terms of moles of $CO_2$ absorbed per mole of amine than secondary and primary amines. This is due to the fact that primary and secondary amines tend to form amine carbamates, otherwise called carbamic acid amine salts, in which one $CO_2$ consumes 2 moles of amine:

$$2R^1R^2NH + CO_2 \Rightarrow R^1R^2NCO_2^- H_2N^+ R^2R^1 \quad (6)$$

Tertiary amines, which do not have a hydrogen atom on the nitrogen, do not form stable carbamates, but only act as buffers by reacting with the protons formed in Reaction 4, as is illustrated in Reaction 5. The amine bicarbonate salts produced contain a 1:1 ratio of $CO_2$ to amine, thus potentially achieving higher loading than the primary or secondary amines. The loading of $CO_2$ in various solvents, in units of moles $CO_2$/mole of absorbent, is given in Table 2.

Aqueous tertiary amine $CO_2$ absorbents have relatively slow mass transfer rates due to the fact that the $CO_2$ hydration (Reaction 2) is rate limiting. This drawback can be reduced or eliminated by a catalyst, which can also be considered to function as an "activator". Secondary amines are particularly favored catalysts. Sterically unhindered secondary and primary amines react rapidly with $CO_2$ by the formation of carbamates (Reaction 6). The carbamates of primary amines tend to be relatively stable while those of secondary amines hydrolyze easier to bicarbonate and the protonated amine, so that both secondary amine carbamate and the bicarbonate salt of the amine coexist in the aqueous solution:

$$R^1R^2NCO_2^- H_2N^+ R^2R^1 + H_2O \Rightarrow R^1R^2NH_2^+ + HCO_3^{31} + R^1R^2NH \quad (7)$$

If a tertiary amine is also present in the solution, then the protonated secondary and tertiary amine equilibrate with each other, giving the net result of catalyzing the hydration of $CO_2$ and the formation of the tertiary amine bicarbonate salt:

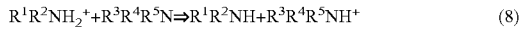  (8)

As mentioned previously, tertiary amines can potentially react 1:1 with $CO_2$ rather than about 2:1 as is the case with primary and secondary amines. Thus, by using at least one tertiary amine and at least one secondary amine, the deficiency of the slow reaction rate of tertiary amines may be reduced or eliminated. Another advantage of the instant invention is that secondary amines absorb $CO_2$ rapidly thereby minimizing the amount of mass transfer equipment required. It will be appreciated that the faster the mass transfer rate, the smaller the size of the absorption column and, thus, the lower the capital cost required.

Accordingly, in another embodiment, the absorbent further also comprises at least one secondary amine. The secondary amine may be at least one piperazine.

In another embodiment, the at least one secondary amine is selected from the group consisting of piperazine, N-(2-hydroxyethyl)piperazine and an N-(hydroxypropyl) piperazine and mixtures thereof.

In another embodiment, the at least one secondary amine is selected from the group consisting of piperazine, N-(2-hydroxyethyl)piperazine, and mixtures thereof.

In another embodiment, the absorbent comprises an aqueous solution comprising 10–50 wt % of the tertiary amine and 1–40 wt % of a secondary amine.

In another embodiment, the absorbent comprises 10–50 wt % of the tertiary amine, 0–8 wt % of piperazine, 1–30 wt % of N-(2-hydroxyethyl)piperazine with the remainder comprising water.

Another advantage of the instant invention is that the absorbents have relatively low volatility thus reducing the losses of the $CO_2$ absorbent into the treated gas and the product $CO_2$. If the absorbent used is volatile, then it will tend to be lost from the $CO_2$ capture system both with the treated feed gas (i.e. the treated gas which exits an adsorption column) and with the product $CO_2$ (i.e. the off gas stream which exits a stripping column). Aqueous MEA at 30% by weight, for example, has an MEA vapor pressure of about 0.2 mm Hg at 60° C. This means that gas which is treated for $CO_2$ removal with 30% by weight aqueous MEA at 60° C. contains approximately 260 ppmv of MEA in the treated gas. In order to prevent this loss of absorbent and emission to the environment, a water wash stage must be used prior to sending the treated gas to a stack. This requirement adds capital cost to the scrubbing unit and additional operating cost in fan power to overcome the extra pressure drop through the water wash section. Similarly, the gaseous $CO_2$ byproduct produced in the regeneration tower will also be contaminated with MEA unless a reflux rectification section is present in the regeneration column above the rich amine feed point. The tertiary amine $CO_2$ absorbents used in accordance with the instant invention have a very low volatility so that it is not necessary to remove solvent vapor from the treated gas or the $CO_2$ byproduct. Table 3 lists the vapor pressure of representative compounds. Preferably, the tertiary amine absorbent has a vapor pressure at 120° C. less than about 5 mm Hg, more preferably less than about 1 mm Hg, and most preferably less than about 0.5 mm Hg as a pure compound.

If the vapor pressure of all or a portion of the absorbent (e.g., a secondary amine such as piperazine) is relatively high such that there are significant amine losses during the process or environmental regulations require a reduction in the amount of amine released from the process, then the method may further comprise treating the $CO_2$ lean stream from the absorption step to remove the amine to a level such that the treated gas stream that is released from the process is below the level that is set by environmental regulations regulating the amount of amine that may be vented to the atmosphere. The amine may be removed by means of a water wash. This can be achieved by adding a short mass transfer section above the lean amine feed point in an absorbing tower and feeding water on top, or it can simply be a water irrigated mesh pad mist eliminator. The water wash is generally required for amines having vapor pressure greater than about 1 mm Hg @ 120° C., so that the treated gas which is released to the atmosphere does not contain unacceptable amounts of amine, either from a pollution or from an amine loss point of view. Accordingly, as set out in Table 3, due to their vapor pressures, N,N'-di-(2-hydroxyethyl)piperazine (DIHEP), triethanolamine (TEA) and the sulfonic acids are preferred absorbents. A similar method may be used to prevent loss into or contamination of the $CO_2$ product stream.

Another advantage of the instant invention is that the $CO_2$ absorbents that are used are more stable to chemical degradation and oxidation than solvents in the prior art. Degradation of the amine solvents has been a major problem for processes capturing $CO_2$ from flue gas. Not only does the degradation cause a loss in scrubbing capacity and the need to replace the solvent, but the degraded solution tends to become more corrosive, particularly to carbon steel. Degradation may occur by acid catalyzed degradation, degradation caused by reaction of the absorbent with $CO_2$, degradation caused by reaction of the absorbent with $SO_2$ and oxidative degradation. Different amine solvents react differently to the various types of degradation.

Acid catalyzed reactions, which in aqueous systems normally means catalysis by hydrogen ions, can affect different absorbents to varying degrees. Types of reactions that are catalyzed by acidity are alcohol dehydration to form an olefin and dealkylation of the amine nitrogen. Degraded amine solutions may contain compounds containing other functional groups, such as double bonds, carbonyl compounds and carbamates, which are susceptible to further acid catalyzed reactions. In $CO_2$ scrubbing, the pH of the absorbent is normally in the alkaline range. However, ingress of strong acids such as sulfuric or hydrochloric or formation of organic acids by oxidation of the absorbent may provide sufficient acidity to accelerate certain reactions at high temperature, such as alcohol dehydration. The use of the absorbents taught herein results in reduced concentrations of such acids and therefore a decrease in acid catalyzed degradation.

Primary and secondary amines are susceptible to degradation by reacting with $CO_2$ to form carbamates which can further react to give substituted ureas, oxazolidones, imidazolidones and diamine and polyamine coupling products. Advantageously, tertiary amines tend to be much more stable with respect to this type of chemical degradation. Primary and secondary amine nitrogen atoms are good nucleophilic reagents, which enable them to react with $CO_2$ to form carbamates and oxazolidinones. This nucleophilic attack tendency will also result in the formation of higher molecular weight products of coupling two amine molecules together, for example by a nucleophilic displacement of a hydroxyl group by a primary or secondary nitrogen. Advantageously, tertiary nitrogen atoms are not nearly as reactive, since they lack a hydrogen atom, which is a very effective leaving group in such a reaction and also due to the generally higher steric hindrance of attack by a tertiary nitrogen. While under extreme conditions $CO_2$ can accelerate the degradation of even tertiary amines, it is believed that the reaction mechanism is that of general acid catalysis by the hydrogen ions generated by the ionization of the carbonic acid rather than an involvement of the carbonate or bicarbonate ion as a reactant as is the case with the primary and secondary amines.

Sulfur dioxide forms sulfurous acid, a fairly strong acid, on dissolving in water. It will react with the alkaline $CO_2$ absorbent to produce a so-called heat stable salt (HSS) which is not steam regenerable and which therefore neutralizes the absorbent. For this reason, processes of the prior art require that as much as possible of the $SO_2$ that is produced on burning sulfur containing fossil fuel be removed before the flue gas is treated for $CO_2$ capture. $SO_2$, in addition to being an acid, can react with a hydroxyl group of an alkanolamine to form a sulfonic acid, which is a strong acid and therefore will form a heat stable salt. The sulfonic acid may also react further by elimination to yield an olefin as in the acid catalyzed dehydration reaction.

Another advantage of the instant invention is that certain tertiary amines used in accordance with the instant invention are stable to and may also be used to remove $SO_2$ from the feed gas. The tertiary amine may be one or more of the tertiary amines listed herein. Thus, the feed gas to $CO_2$ capture may contain $SO_2$ without the absorbent degrading due to reaction with $SO_2$. For example, the feed stream may contain up to 500 ppmv, more preferably up to 200 ppmv and most preferably up to 100 ppmv $SO_2$. At such levels, a pretreatment step is not required to reduce the level of $SO_2$ to prevent excessive degradation of the absorbent. At the same time, the presence of $SO_2$ may be used to limit or prevent oxidative degradation of the absorbent. In accordance with this aspect of the invention, sufficient $SO_2$ may be either slipped from an upstream sulfur dioxide removal process (a "$DeSO_x$ process") or added to the feed gas to the process or the liquid absorbent to maintain sufficient sulfite in the $CO_2$ absorbent to effectively scavenge and react with molecular oxygen which is absorbed from the feed gas, so as to make it unavailable for oxidizing the amine solvent. Accordingly, the feed gas which is treated for $CO_2$ removal may contain from 0 to 1000 ppmv, preferably from 0 to 400 ppmv and most preferably from 0 to 200 ppmv $SO_2$.

In accordance with this aspect of the instant invention, there is provided a process for recovering $SO_2$ and $CO_2$ from a feed gas stream comprising:

(a) treating the feed gas stream in an $SO_2$ scrubbing loop with a first absorbent stream to obtain a $SO_2$ rich stream and a $SO_2$ lean stream and subsequently treating the $SO_2$ rich stream to obtain a first regenerated absorbent stream which is used in the $SO_2$ scrubbing loop;

(b) treating the $SO_2$ lean stream in a $CO_2$ scrubbing loop with a second absorbent stream to obtain a $CO_2$ rich stream and subsequently treating the $CO_2$ rich stream to obtain a second regenerated absorbent stream which is used in the $CO_2$ scrubbing loop; and, (c) treating at least a potion of one or both of the first and second regenerated absorbent streams to remove heat stable salts wherein the absorbent used in each of the scrubbing loops comprises at least one tertiary amine and at least one secondary amine as an activator.

In one embodiment, the process further comprises selecting the tertiary amine from N,N'-di-(2-hydroxyethyl) piperazine, N,N'-di-(3-hydroxypropyl)piperazine or mixtures thereof, and selecting the secondary amine from N-2-hydroxyethylpiperazine, piperazine, a N-(hydroxypropyl) piperazine or mixtures thereof as an activator. Alternately, or in addition, only the first regenerated absorbent stream is treated to remove heat stable salts and a bleed stream of the treated amine is bled into the $CO_2$ removal loop and a bleed steam from the $CO_2$ scrubbing loop is provided to the $SO_2$ scrubbing loop.

Preferably, a single absorbent system is used to scrub $SO_2$ and $CO_2$. The absorbent system preferably comprises diamines that in one form can scrub $SO_2$ and in another, scrub $CO_2$. The preferred diamines are a mixture of tertiary and secondary piperazines, and, in particular, one or both of hydroxyethyl or hydroxypropyl piperazines.

If the two circuits (i.e. adsorption and regeneration loop) are kept separate with no transfer of solvent between them, then the solvent for the two loops can be chosen independently and no activator is required for the $SO_2$ capture. Accordingly, the absorbent system may be one or more tertiary amines.

In another embodiment, the process further comprises adjusting the treatment of the feed gas stream in the $SO_2$ scrubbing loop such that the $SO_2$ lean gas stream has a concentration of $SO_2$ so as to maintain a concentration of sulfite in the $CO_2$ scrubbing loop sufficient to essentially prevent the oxidation of the absorbent by molecular oxygen.

In another embodiment, the process further comprises conducting steps (a) and (b) in a single absorption column wherein a chimney tray maintains separation of the solvents in the two scrubbing loops.

In another embodiment, the process further comprises selecting the same amines for each loop.

In another embodiment, the process further comprises adjusting the treatment of the feed gas stream in the $SO_2$ scrubbing loop such that the $SO_2$ lean gas stream has a concentration of $SO_2$ so as to maintain a concentration of sulfite in the $CO_2$ scrubbing loop sufficient to essentially prevent the oxidation of the absorbent by molecular oxygen.

In accordance with another embodiment according to this aspect of the invention, there is provided a process for recovering $SO_2$ and $CO_2$ from a feed gas stream comprising:

(a) subjecting the feed gas stream to a $SO_2$ removal step using a $SO_2$ absorbent and recovering a $SO_2$ lean stream and a $SO_2$ rich absorbent stream;

(b) regenerating the $SO_2$ absorbent at a first temperature, preferably from 80 to 110° C., to obtain a regenerated $SO_2$ absorbent stream and a first vapour stream;

(c) subjecting the $SO_2$ lean stream to a $CO_2$ removal step using a $CO_2$ absorbent and recovering a $CO_2$ lean stream and a $CO_2$ rich absorbent stream;

(d) regenerating the $CO_2$ absorbent at a second temperature, preferably from 120 to 140° C., to obtain a regenerated $CO_2$ absorbent stream and a second vapour stream wherein the first temperature is lower than the second temperature so that at least a portion of the second vapour stream is used to regenerate the $SO_2$ absorbent.

In one embodiment, the $SO_2$ absorbent is regenerated by steam produced in a reboiler and at least a portion of the second vapour stream is used to provide heat to the reboiler.

In another embodiment, the second vapour stream is used to indirectly heat to the $SO_2$ absorbent reboiler and is subsequently returned to a reflux separator of the $CO_2$ absorbent.

Another advantage of the instant invention is that the selection of absorbent and the oxidation inhibitor stabilize the $CO_2$ absorbent chemical against oxidation by the $O_2$ content of the feed gas. The addition of an oxidation inhibitor permits choosing the amine absorbent on the basis of functionally important criteria such as appropriate $pK_a$ to optimize energy usage and chemical stability to prevent loss of amine. In addition, tertiary alkanolamines are more resistant to oxidation than primary or secondary amines so the absorbent uses these types of buffer chemicals as the main component. Minor proportions of relatively stable secondary amines, such as piperazine and/or N-2-hydroxyethylpiperazine, are used to accelerate the rate of $CO_2$ absorption. Oxidative degradation of organic molecules in the presence of oxygen often is the result of a free radical chain reaction. The rate of degradation can be decreased by the addition of an oxidation inhibitor, such as a free radical scavenger to the system, which reduces the length of each chain reaction by capturing and inactivating the degradation propagating radical species. Thiosulfate is a preferred free radical scavenger. It may be added to the system as sodium thiosulfate or it may be generated in situ by the reaction of sulfide (from, e.g., either $H_2S$ or $Na_2S$) or elemental sulfur with sulfite. The hydroxyl groups of alcohols or alkanolamines are also effective free radical chain terminator antioxidants under the conditions of the process.

Accordingly, in one embodiment, the oxidation inhibitor comprises a free radical scavenger. The free radical scavenger may be selected from the group consisting of alcohols, alkanolamines, thiosulfate and mixtures thereof and, preferably is selected from the group consisting of at least one phenolic amine antioxidant, at least one aromatic amine antioxidant, thiosulfate and mixtures thereof. The free radical scavenger is preferably thiosulfate. Alternately, or in addition, the oxidation inhibitor may comprise an oxygen scavenger. The oxygen scavenger may be selected from the group consisting of sulfite, bisulfite and mixtures thereof.

In one embodiment, the process further comprises maintaining a sufficient oxidation inhibitor concentration in the absorbent to prevent or essentially prevent the oxidation of the absorbent by molecular oxygen. By "essentially prevent" is used to refer to limiting the oxidative loss of absorbent to a commercially reasonable level (e.g. less than 5% per month of the total amine charge degraded to species ineffective for $CO_2$ capture).

In a particularly preferred embodiment, the oxidation inhibitor comprises a mixture of at least one oxygen scavenger and at least one free radical scavenger. It has been determined that the combination of an oxygen scavenger, such as sulfite, and a free radical scavenger, such as thiosulfate, produces the best protection against oxidation. The scavenger, if present in sufficient quantities, will react with most of the oxygen and the minor amount of $O_2$ not scavenged performs oxidation by a free radical chain reaction which is effectively quenched by the free radical scavenger.

In accordance with another aspect of the instant invention, chelating agents such as amine or polyamine polycarboxylic acids may optionally be added to the solvent to inhibit metal ion catalyzed oxidation. The chelating agent is chosen such that it combines the metal or metals present into a form that are not catalytically active.

In accordance with another aspect of the instant invention, the process further comprises subjecting the absorbent to an ion exchange step to remove multivalent metal ions to reduce metal ion catalyzed oxidation of the absorbent. The use of an ion exchange step is preferred to the addition of a chelating agent, since any overdose of chelating agent might increase corrosion.

In any of the preceding embodiments, the ionic strength of the $CO_2$ absorbent may be increased by maintaining a high level of amine or inorganic salts in the solution. High ionic strength aqueous solutions decrease the solubility of $O_2$, thereby minimizing its negative effects. This is illustrated by the solubility of oxygen in aqueous sodium sulfate solutions. At 37° C., the solubility of $O_2$ in water at an oxygen partial pressure of 1 atmosphere is about 35 milligrams per liter. In 1.5 molar $Na_2SO_4$ solution, the solubility is about 10.5 mg/l. (Data from "Handbook of Chemistry and Physics, $71^{st}$ Edition, CRC Press) Total salt concentration is thus preferably maintained between about 0.1 moles/liter up to about the solubility limit. The absorbent may be in solution and the process further comprises increasing the concentration of absorbent or salts in the solution to reduce the solubility of $O_2$ in the solution. Salts may result from adding caustic to neutralize HSS and liberate amine for scrubbing by adding caustic. For example, sulfite amine salts when neutralized with caustic will produce sodium sulfite. This will than be oxidized to sodium sulfate as the sulfite scavenges oxygen.

With some amines, it is advantageous for energy consumption and high purity of treated gas to work at a HSS level greater than zero. Thus, while In any of the preceding embodiments, the process may further comprise removal of heat stable amine salts from the $CO_2$ absorbent, preferably the process further comprises treating the $CO_2$ absorbent to remove only a portion of the heat stable amine salts, such as by treating only a portion of the regenerated absorbent to remove heat stable salts. Thus, some heat stable salts will be left in the regenerated absorbent that is used in an absorption column. Accordingly, the HSS removal process provides a treated amine that is low in HSS so that it is suitable for $CO_2$ removal duty, which requires essentially the free base amine or diamine, except for preferably a small amount of HSS (e.g. from about 0.001 to about 0.25 equivalents of amine HSS per mole amine) to improve performance. The preferred equivalents of amine HSS as a fraction of the total amine is dependent on the amine in use and the operating conditions for $CO_2$ capture.

In accordance with the instant invention, there is also provided compositions and processes of capturing $CO_2$, $SO_2$ and $NO_x$ simultaneously (e.g. sequentially in the same adsorption column). Accordingly in any of the preceding embodiments, the feed gas stream may further comprise $NO_x$ and the process may further comprise treating the feed gas stream to remove at least a portion of the $NO_x$.

In one such embodiment, the process further comprises providing a reagent to react with the $NO_x$ to produce reaction products comprising molecular nitrogen, sulfonated ammonia chemicals, and sulfate and/or dithionate ions, treating the $CO_2$ rich stream to remove sulfate and/or dithionate ions and regenerate the reagent and adjusting the pH of the regenerated absorbent from about 7 to about 9.5. The reagent may be selected from the group consisting of a metal chelate, sulfite and mixtures thereof. The metal chelate may be selected from the group consisting of iron nitrilotriacetic acid, iron ethylenediaminetetracetic acid, iron diethylenetriaminepentaacetic acid and mixtures thereof.

In accordance with another such embodiment, there is provided a process for removal of $CO_2$ and $NO_x$ from a gas stream containing $SO_2$ at a mole ratio <5 times the $NO_x$ content, comprising treating the feed gas stream with a regenerated absorbent comprising at least one tertiary amine absorbent having a $pK_a$ for the amino function of from about 6.5 to about 9 to obtain a $CO_2$ rich stream and subsequently treating the $CO_2$ rich stream to obtain the regenerated absorbent, in which the improvement comprises an oxidation inhibitor or combination of inhibitors and further comprising providing a metal chelate and sulfite and/or other reactants and reducing agents to react with the $NO_x$ to produce reaction products comprising molecular nitrogen, sulfonated ammonia chemicals, and sulfate and/or dithionate ions, treating the $CO_2$ rich stream to remove heat stable salts including sulfate and/or dithionate ions and adjusting the pH of the regenerated absorbent from about 7 to about 9.5.

Preferably, the regenerated absorbent comprises greater than 0.5 wt. %, more preferably greater than 1 wt. % and most preferably greater than 2% sulfite. Preferably, the regenerated absorbent comprises greater than 0.05 wt. %, more preferably greater than 0.5 wt. %, and most preferably greater than 1 wt. % thiosulfate. Preferably, the regenerated absorbent comprises greater than 0.005, more preferably greater than 0.05, and most preferably greater than 0.1 molar FeEDTA. Preferably, the regenerated absorbent has a pH in the range 6–9.5, and preferably in the range 7–9.5. Preferably, the maximum concentrations of the metal chelate and sulfite and/or other reactants and reducing agents are each equal to their solubility limit at 20° C.

BRIEF DESCRIPTION OF THE DRAWINGS

These and other advantages of the instant invention will be more fully and completely understood in accordance with the following description of the preferred embodiments of the invention in which.

DETAILED DESCRIPTION OF THE INVENTION

Figure 1:
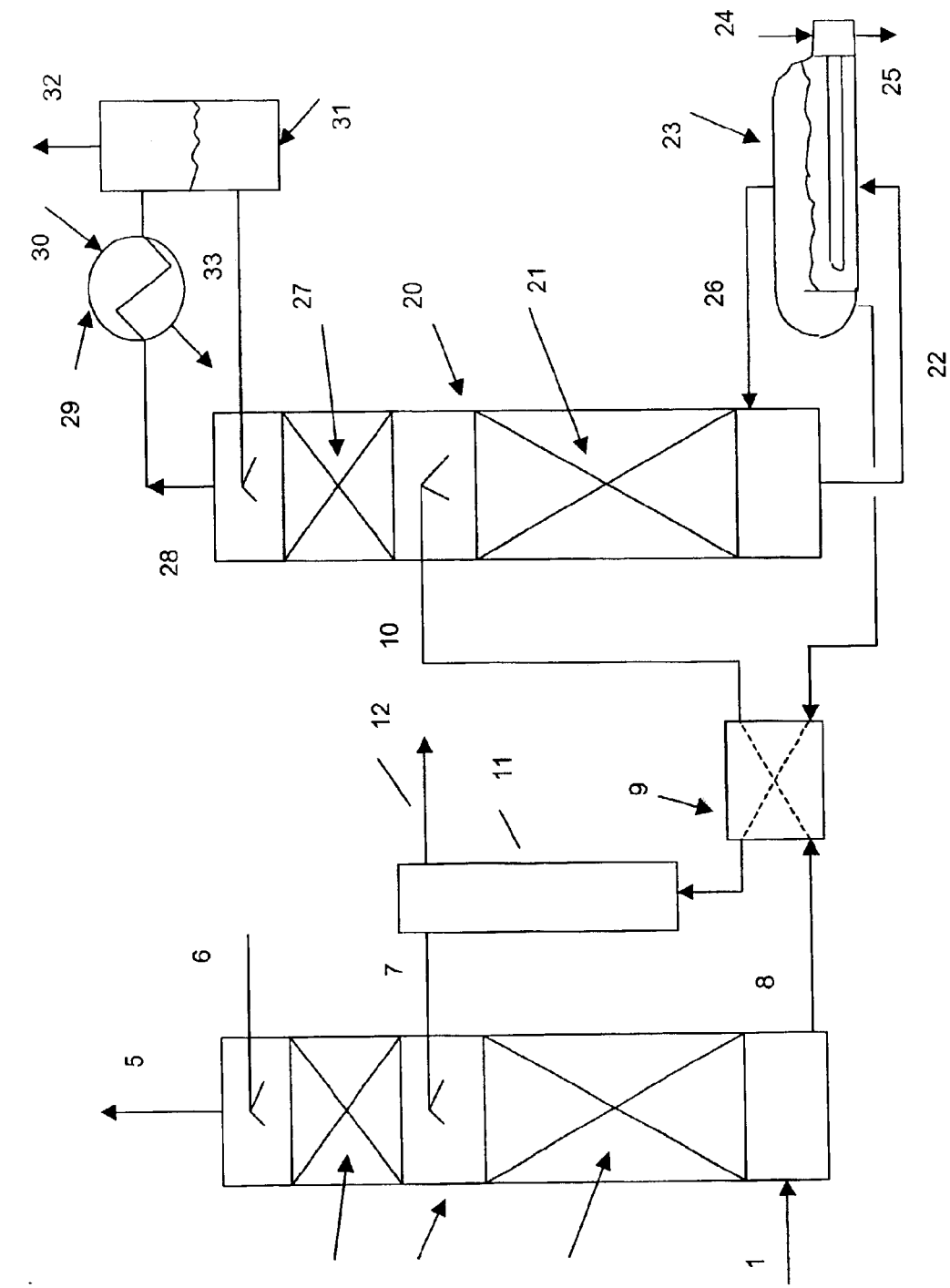
FIG. 1 is a schematic diagram of a process to capture $CO_2$ from a feed gas stream according to a first embodiment of the instant invention.

The process flow diagram for one embodiment of a process to capture $CO_2$ according to the present invention is shown in FIG. 1. Referring to FIG. 1, a carbon dioxide containing feed gas stream 1 is treated to obtain a $CO_2$ rich stream 8. The feed gas stream 1 may be any stream which contains $CO_2$ at levels which require treatment for $CO_2$ removal before the gas is released to the atmosphere and is preferably a waste gas stream, such as flue gas streams, kiln gas, reverberatory furnace gas, fluidized catalytic cracker (FCC) catalyst regenerator tail gas and the like.

$CO_2$ rich stream 8 is prepared by contacting feed gas stream 1 with any of the $CO_2$ absorbents taught herein and preferably one or more of those set out in Table 1. As shown in FIG. 1, feed gas stream 1 flows into a gas-liquid contact apparatus 2, where intimate contact between feed gas stream 1 and lean absorbent stream 7 occurs. The apparatus 2 may be any gas-liquid contactor or absorption tower known in the art such as a spray or packed tower. FIG. 1 illustrates a packed tower, wherein gas liquid contact is promoted by suitable random or structured packing 3 in the column. $CO_2$ is absorbed into the lean absorbent 7, producing rich $CO_2$-containing absorbent, which exits from the apparatus 2 as $CO_2$ rich stream 8.

The feed gas stream 1, which is depleted in $CO_2$, is optionally washed with water (stream 6), such as in another packed section 4, to remove absorbent that may have splashed or volatilized into the treated gas stream traveling upwardly through apparatus 2. The water of stream 6 may be a part of the condensate stream 33 or it may be makeup water introduced to the process. The water balance in the overall process may be maintained by adding water, for example via stream 6, or withdrawing water from the process, such as by directing a part of stream 33 to waste. The gas then leaves the apparatus 2 as treated feed gas stream 5 for either release into the atmosphere or for further treatment or use.

In order to conserve energy, heated streams may be used to preheat cooler streams that are subsequently fed to the process equipment. For example, as shown in FIG. 1, $CO_2$ rich stream 8 flows through a cross heat exchanger 9, where it is indirectly heated by stream 34 (a heated lean amine stream which is recycled to absorb $CO_2$), and is then introduced into regeneration tower 20 as stream 10.

$CO_2$ rich stream 8 is then treated at a temperature higher than the absorption temperature in apparatus 2 to regenerate the absorbent. At this stage, the $CO_2$ in the downwardly moving absorbent is removed by upwardly moving stripping gas or steam to produce a $CO_2$ rich product stream 28 and a regenerated absorbent (lean absorbent stream 22). Inert gas stripping may also be practiced for stripping the $CO_2$ from the $CO_2$ rich stream in tower 20. The absorbent may be heated by any means known in the art. Preferably, the absorbent is reheated by means of steam, such as in a steam-stripping tower 20, but other sources of heat such as hot gas, heat transfer liquids and direct firing may be used.

Tower 20 can be of either a packed or trayed design. A packed tower with a packing section 21 is shown in FIG. 1 below the rich solvent feed level (stream 10). The rich solvent is stripped of $CO_2$ as it flows downward in the tower and into a reboiler 23. The reboiler is heated by any means known in the art. Preferably reboiler 23 is indirectly heated by stream 24 (which may be steam and may be obtained from any source) through, e.g., a heat transfer tube bundle, producing a steam condensate stream 25 which may be recycled to produce additional steam or used elsewhere in the plant. The boiling of the aqueous solvent (absorbent) in reboiler 23 produces a flow of steam 26 into the regeneration tower 20. The steam ascends through the column, heating the downward flowing solvent and carrying upwards the $CO_2$ evolved from the solvent. The steam and $CO_2$ mixture exits the tower as stream 28.

Preferably, stream 28 is treated to remove excess water vapor contained therein. Preferably, the water vapor is removed by condensation (e.g. by means of cooling with a cooling liquid). As shown in FIG. 1, a flow of cooling water 30 into overhead condenser 29 causes condensation of most of the steam in stream 28, producing a 2-phase mixture, which flows into the condensate accumulator 31. The gaseous phase, which is water saturated $CO_2$, leaves as product stream 32 for use. The condensed water is returned to the tower 20 as stream 33, where it flows downward through optional packed section 27. The cool condensate of stream 33 serves to wash volatilized absorbent from the vapors before they leave the tower 20 as stream 28. This helps to reduce loss of absorbent chemical with the gaseous $CO_2$ stream 32. It will be appreciated that additional treatment steps may be used to further limit the loss of absorbent from the process.

Preferably, hot lean amine stream 34 is used to preheat $CO_2$ rich stream 8. However, it will be appreciated that stream 8 may be heated by other means (e.g. by passing it through reboiler 23 or heating stream 8 upon entry to tower 20 or any combination thereof. As shown in FIG. 1, lean amine leaves regeneration tower 20 as stream 22 and enters the reboiler 23. The solvent then leaves the reboiler 23 by overflowing a weir as heated lean adsorbent stream 34, which passes through the cross heat exchanger 9 to preheat stream 8. The lean solvent leaves heat exchanger 9 as a cooler lean absorbent stream 11, which may optionally be cooled further by a lean solvent trim cooler (not shown).

A slipstream 13 of flow from stream 11 enters the heat stable salt (HSS) removal unit 12 and stream 14 which is the solvent reduced in HSS rejoins stream 11 to form stream 7 (the lean absorbent stream which is introduced into tower 2). HSS removal may be effected by any method known in the art, such as electrodialysis or ion exchange. The stream 7 enters the absorption tower 2 for capturing $CO_2$ from the feed stream 1.

The process may be operated with any convenient pressure in the absorber 2. If the feed gas stream 1 is flue gas from a boiler, which usually is operated near atmospheric pressure, then tower 2 may be operated at about atmospheric pressure or a bit below the pressure of feed stream 1 so as to favor the flow of feed gas 1 into tower 2. The regeneration tower 20 is often operated at a pressure slightly over atmospheric, generally not exceeding 3 bar absolute. An above-atmospheric pressure in the regenerator helps to strip as much $CO_2$ as possible, due to the higher temperatures that can be achieved. Furthermore, the byproduct $CO_2$ will be at a higher pressure, helping it to flow to a downstream unit without the aid of a fan or compressor.

The absorbent solution preferably comprises water, at least one tertiary alkanolamine (10–50 wt %, more preferably 20–45 wt %, most preferably 25–40 wt %), at least one secondary amine (1–40 wt %, more preferably 3–35 wt %, most preferably 10–30 wt %), at least one oxygen scavenger (0.1–10 wt %) and optionally inert salts (0–10 wt %) such as sulfate salts produced by the oxidation of sulfite and thiosulfate. Unless otherwise stated, all weight percents are based on the total weight of the absorbent solution. The tertiary amine is preferably selected from the group consisting of methyldiethanolamine, triethanolamine, N,N'-di-(2-hydroxyethyl)piperazine and mixtures thereof. The secondary amine is preferably a mixture of piperazine (0–8 wt %, more preferably 1–8 wt %, most preferably 3–6 wt %) and N-(2-hydroxyethyl)piperazine (1–30 wt %, more preferably 2–25 wt %, most preferably 5–25 wt %). The oxygen scavenger preferably comprises a free radical scavenger, preferably thiosulfate salt (preferably 0.1–3 wt % thiosulfate, $S_2O_3^{=}$) and an oxygen scavenger, preferably sulfite salt (0.1–5 wt % sulfite).

In accordance with another embodiment of the instant invention, the process is used to remove both $SO_x$ and $CO_2$ from a feed gas using the same absorbent. In known processes, if $SO_2$ is present in the feed gas to an amine buffer based reversible $CO_2$ capture process, it must be removed in a pretreatment step to avoid neutralizing the $CO_2$ absorbent as heat stable sulfite salts. Since $CO_2$ is a much weaker acid than $SO_2$, much stronger bases must be used for capture of $CO_2$ than for $SO_2$. This necessarily makes the $SO_2$ salt of the $CO_2$ capture amine so stable that stream stripping regeneration of the $SO_2$ is effectively ineffective and therefore simultaneous steam regenerable capture of both $SO_2$ and $CO_2$ is fundamentally impractical. Generally, therefore, in known processes, $SO_2$ removal is conducted upstream of contact with the $CO_2$ absorbent by using one of the processes known in the art, such as caustic scrubbing, limestone scrubbing or regenerable $SO_2$ scrubbing. Operating two separate and different processes adds to the cost of $CO_2$ capture and makes the operation more complex.

Surprisingly, we have found that regenerable removal of both $SO_2$ and $CO_2$ can be accomplished with the buffer amine disclosed herein used in two separate steps. This result is achieved by using a suitable diamine absorbent under two different solution conditions. The $SO_2$ removal is accomplished as described in U.S. Pat. No. 5,019,361, the disclosure of which is incorporated herein by reference with the stronger amine function in heat stable salt form, i.e. as the so-called "half salt". The weaker amine then is the effective buffer for $SO_2$ absorption at a pH range of about 3–6. The $CO_2$ capture is conducted with the buffering agent in about the 6–9 pH range, due to the weaker acidity of $CO_2$ compared to $SO_2$. Using the same diamine in the free base form, which is chosen to have its stronger $pK_a$ in this range, allows effective steam regenerable $CO_2$ capture.

The advantages of this embodiment are as follows.

(a) Both the absorption steps can be done in one vessel, separated by, e.g., a chimney tray, since the same type of gas-liquid contacting would be suitable for both.

(b) Storage for only one absorbent chemical is required.

(c) The $SO_2$ absorption in the $SO_2$ removal circuit need not be complete, saving capital and operating costs due to the less stringent removal requirement. Any $SO_2$ in the gas contacting the $CO_2$ circuit absorbent will be captured completely due to the high pH and will remain in the solvent as a heat stable salt, i.e. it will not contaminate the byproduct $CO_2$.

(d) Heat stable salt control of the $CO_2$ capture circuit, due to ingress of, $SO_2$ and perhaps other strong acids, is performed inexpensively by flowing HSS containing absorbent from the $CO_2$ circuit into the $SO_2$ circuit and replacing it with free base absorbent from the $SO_2$ circuit HSS removal unit.

As exemplified in FIG. 2, which is a simplified drawing of the equipment, the process may operate as follows. A feed gas stream 50, containing both $SO_2$ and $CO_2$, enters an optional prescrubber 51 where it is saturated with a spray of water supplied by pump 52 and is thereby cooled to, e.g., its adiabatic saturation temperature. The spray of water also removes at least some of the particulate matter and strong acids such as hydrochloric acid and sulfuric acid from the feed gas. The pretreated gas flows from prescrubber 51 to the $SO_2$ removal section of tower 54 through the chimney tray 53 which serves to prevent the $SO_2$ rich stream 60 from entering the prescrubber 51. Optionally, if the gas is not too hot and/or dirty, the cooling and water saturation can also be performed simultaneously with the $SO_2$ removal in the packed tower section 55 if desired.

The gas, which has optionally been pretreated, is treated in an $SO_2$ scrubbing loop with a first absorbent stream to obtain a $SO_2$ rich stream 60 and a $SO_2$ lean stream. As exemplified in FIG. 2, the optionally pretreated gas stream then flows through, e.g., chimney tray 53 into a $SO_2$ removal circuit of a tower having a packed tower section 55 where the gas flows countercurrently to lean diamine absorbent stream 76 wherein the diamine absorbent is in so-called "half salt" form, as is described in U.S. Pat. No. 5,019,361 Preferably the majority of the $SO_2$ in the feed gas is removed and leaves the tower in the $SO_2$ rich solvent stream 60. The $SO_2$ rich stream 60 is treated to obtain a first regenerated absorbent stream 61, which is used in the $SO_2$ scrubbing loop (i.e. packed tower section 55). $SO_2$ rich stream 60 may be regenerated by any means known in the art such as steam stripping. As shown in FIG. 2, regeneration tower 68 functions like the regeneration tower 21 in FIG. 1 and produces a stream of lean half salt amine solution 61 and a byproduct $SO_2$ stream 64. The peripheral equipment, reboiler, overhead condenser and reflux drum are not shown in FIG. 2 but are preferably arranged as shown in FIG. 1.

Preferably, the first regenerated absorbent stream 61 is treated to remove heat stable salts. Preferably only a portion of first regenerated absorbent stream 61 is so treated with the remainder being returned to packed tower section 55 to absorb more $SO_2$. The amount of heat stable salt which is removed is selected so as to prevent an undesirable buildup of salt in the absorbent. Thus, the HSS removal process is such that the purified absorbent in stream 67 is suitable for $CO_2$ capture, which means that the total salt level in stream 67 is preferably less than 0.5, more preferably less than 0.25 and most preferably less than 0.15 equivalents of acid per mole of diamine.

Figure 2:
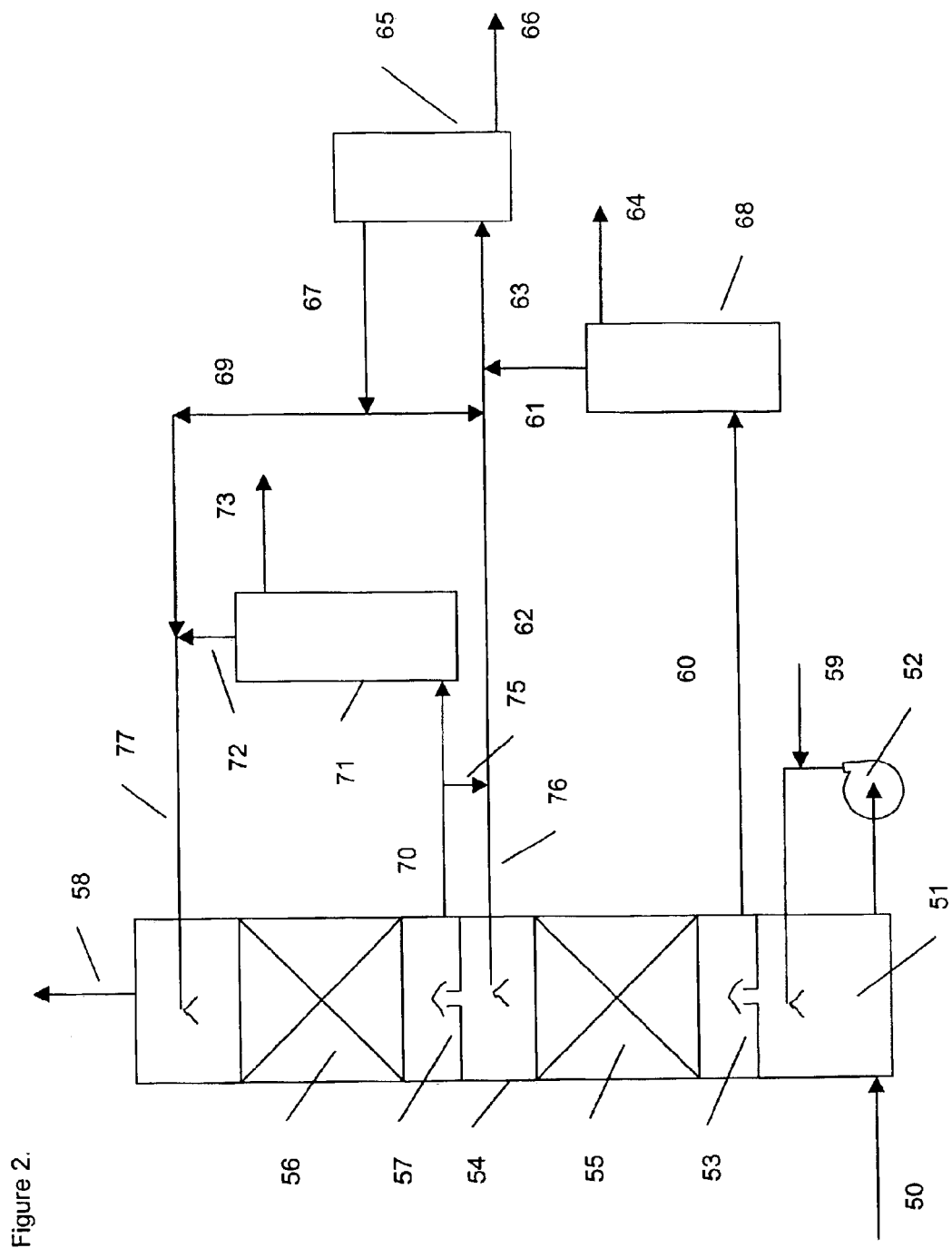
FIG. 2 is a schematic diagram of a process to capture $CO_2$ and $SO_2$ (plus optionally $NO_x$) with one buffering agent in successive steps according to a second embodiment of the instant invention; and, FIG. 3 is a schematic diagram of the sequential removal of $SO_2$ and $CO_2$, showing the use of steam from $CO_2$ regeneration to provide heat for the $SO_2$ regeneration.

In the preferred embodiment of FIG. 2, a portion of the lean half salt diamine solution stream 61 is taken as feed stream 63 for removal of non-steam regenerable acid anions, such as sulfate and chloride, in heat stable salt (HSS) removal unit 65. The removed anions leave in the effluent stream 66. Any suitable method for removal of the HSS known in the art, such as electrodialysis, ion exchange and the like, may be used. The purified absorbent stream 67, except for a portion shown as stream 69, then joins the balance of first regenerated absorbent stream 61 to produce recycle stream 62.

As shown in FIG. 2, the two absorption loops are conducted sequentially on feed gas stream 50. The two loops are operated separately with cross flow to adjust the HSS content the recycled absorbent streams 76 and 77. Thus, stream 69 is added to the lean $CO_2$ absorbent stream 72 to balance the absorbent flowing from the $CO_2$ removal circuit to the $SO_2$ removal circuit as stream 75. Stream 69 flow rate and its total HSS content compared to stream 75 is chosen so as to balance the formation of HSS in the $CO_2$ absorbent, which is largely due to the capture of $SO_2$ not removed in the $SO_2$ removal circuit. It will be appreciated that the flow paths would vary if HSS removal unit 65 were positioned in, e.g., the $SO_2$ removal circuit. If the two loops each had an HSS removal unit 65, then each circuit could be operated independently (i.e. with no cross flow of absorbent between the loops).

The treatment of the gas for $SO_2$ removal in packed tower section 55 results in the production of a $SO_2$ lean stream. This $SO_2$ lean stream is then treated in a $CO_2$ scrubbing loop with a second absorbent stream 77 to obtain a $CO_2$ rich stream 70. The $CO_2$ rich stream 70 is subsequently treated to obtain a second regenerated absorbent stream 72, which is used in the $CO_2$ scrubbing loop. The $CO_2$ scrubbing loop may be operated in a different tower than the $SO_2$ scrubbing loop. In accordance with the preferred embodiment of the invention exemplified in FIG. 2, the $CO_2$ scrubbing loop is operated in the same tower as the $SO_2$ scrubbing loop. According to this embodiment, the gas treated for $SO_2$ removal in the packed tower section 55 then flows through, e.g., chimney tray 57 and is washed countercurrently with $CO_2$ absorbent stream 77 in packed section 56. The $CO_2$ rich absorbent stream 70 flows to a regenerator, e.g., a regeneration tower 71, which is preferably of a design equivalent to the regeneration tower 20 shown in FIG. 1. The $CO_2$ product stream that exits tower 71 may be treated to remove excess absorbent or water, such as by means of a reflux accumulator (not shown), to produce a $CO_2$ product stream 73 and a $CO_2$ lean absorbent stream 72 which flows into the absorption tower, combined with stream 69, as stream 77.

The treated feed gas stream 50, now reduced in $SO_2$ and $CO_2$ content, flows out of the absorber tower 54 as stream 58 for further treatment, use or exhaustion into the atmosphere. The $SO_2$ content of stream 58 generally will be very low since it is scrubbed twice for $SO_2$ removal, the scrubbing in the packed section 56 being especially effective since the absorbent 77 is at such a high pH value as to have great capacity and affinity for $SO_2$. The degree of $CO_2$ removal is dependent on the operating parameters of the process, such as degree of leanness ($CO_2$ content) of the lean amine stream 77, the liquid side mass transfer coefficient of the absorbent 77 for $CO_2$, the ratio of moles of absorbent flowing in stream 77 to the moles of $CO_2$ in the gas stream being scrubbed, the temperature and pressure at which the $CO_2$ removal is performed and the effectiveness and time of gas-liquid contact in the packed section 56. In some cases, such as capture of $CO_2$ from fossil fuel fired flue gas for uses like enhanced oil recovery or sequestration to reduce the greenhouse gas emissions, the degree of $CO_2$ removal need not be high.

The preferred absorbents suitable for use in this embodiment are N,N'-di-(2-hydroxyethyl)piperazine (DIHEP) which functions as the tertiary amine of the $CO_2$ capture circuit and N-2-hydroxyethylpiperazine (HEP) and/or piperazine as the secondary amine mass transfer catalyst.

The water content of the $CO_2$ and $SO_2$ capture circuits need not be identical. The solvent composition and operating conditions that are used in the $CO_2$ capture circuit would generally be similar to that described for the capture of $CO_2$ alone according to FIG. 1 as described in the preceding. The operating conditions for the $SO_2$ removal circuit are preferably an absorber pressure of about atmospheric and a temperature of about 50 to 70° C., if flue gas is the feed to the process. The regeneration of the $SO_2$ rich stream is preferably performed at near atmospheric pressure and preferably at a maximum temperature of about 110° C. The absorbent is preferably used in the "half-salt" form, i.e. with heat stable salts at about 0.9 equivalents of acid per mole of diamine.

In accordance with another embodiment of the instant invention, the process is used to remove $SO_x$, $CO_2$ and $NO_x$ from a feed gas that has a low $SO_2$ content using the same absorbent. The currently used amine $CO_2$ capture processes generally require the removal of sulfur dioxide prior to the $CO_2$ removal step in order to avoid neutralizing the absorption capacity of the $CO_2$ absorbent by the $SO_2$, which is a strong acid that cannot be removed from the absorbent by steam regeneration (e.g. stripping). Furthermore, it is often desirable or required by environmental regulations to also remove any nitrogen oxides (nitric oxide, NO, and nitrogen dioxide, $NO_2$, collectively called $NO_x$) from the gas stream. $NO_x$ is an air pollutant responsible for generating smog and causing negative health effects.

It has been surprisingly discovered that it is possible to remove $CO_2$, $SO_2$ and $NO_x$ simultaneously (i.e. by using the same absorbent composition in one or more sequential scrubbing circuits preferably in the same column). This is accomplished by means of combining an absorbent for $CO_2$, and iron chelate capable of reacting with NO to form an iron nitrosyl complex as is described in co-pending U.S. patent application Ser. No. 10/211,514, the disclosure of which is incorporated herein by reference.

The absorbent for $CO_2$ may be any tertiary amine absorbent having a $pK_a$ for the amino function of from about 6.5 to about 9, such as an alkanolamine of Table 1.

The nitrosyl group reacts with the sulfite produced by the absorption of $SO_2$ into the solvent, eventually producing a sulfate and dithionate salts and molecular nitrogen as the end products from the captured $NO_x$ and $SO_2$. The metal chelate may be any compound that will produce such a nitrosyl group. The metal chelate is preferably selected from the group consisting of iron nitrilotriacetic acid, iron ethylenediaminetetraacetic acid, iron diethylenetriaminepentaacetic acid and mixtures thereof.

The $CO_2$ is captured (absorbed) by the alkanolamine buffer and is regenerated by any means known in the art, and preferably by steam stripping in a regeneration tower as disclosed herein to produce a product $CO_2$ stream and a regenerated absorbent. The regenerated stream is preferably also treated to remove sulfate and/or dithionate ions. The pH of the regenerated absorbent is preferably adjusted from about 7 to about 9.5.

Optionally, the absorbent also includes an oxidation inhibitor or combination of inhibitors (in particular preferably one or more oxygen scavengers and one or more free radical scavengers) and/or other reactants and reducing agents to react with the $NO_x$ to produce reaction products comprising molecular nitrogen, sulfonated ammonia chemicals, and sulfate and/or dithionate ions.

The sulfate and dithionate salts can be eliminated from the solvent by a variety of means such as various types of electrodialysis, or by the addition of sodium hydroxide, potassium hydroxide or some other suitable alkali followed by low temperature crystallization and separation of the sodium salts. The denitrosation and other reactions necessary for the regeneration of the $NO_x$ removal reagent and conversion of the so-called N,S products can be made to go to completion either:

(a) in a digester tank prior to the steam stripping tower of the $CO_2$ absorbent; or (b) in the tower and reboiler of the $CO_2$ regeneration tower; or (c) in a digester tank after the $CO_2$ regeneration tower.

Option (a) would be attractive when the NO absorbent chosen and the operating conditions and solvent concentrations are such that the $CO_2$ produced would be undesirably contaminated by the NO and/or $N_2$ evolved. If contamination of the byproduct $CO_2$ is not of material importance and/or if no $N_2$ or NO are evolved during the $CO_2$ regeneration process, then alternative (b) might be the most attractive. If the regeneration reactions are so slow that additional time at elevated temperature is required for the completion of the reactions, then embodiment (c) might be the preferred option.

The $SO_2$ is a reactant for the regeneration of the NO absorbent. If its concentration is insufficient to fully complete the regeneration, then additional $SO_2$ or other reagent such as hydrogen sulfide, $H_2S$, may be added to the NO loaded solvent prior to the regeneration step. If $SO_2$ in excess of what is required for the $DeNO_x$ reactions is present in the feed gas, this can be removed from the solvent as the sodium salt along with the regeneration reaction products The process flow diagram of this embodiment of the invention is almost identical to FIG. 1, for the case where the NO removal agent regeneration reactions go to completion in the $CO_2$ regeneration tower and in the reboiler. The solvent composition for this embodiment comprises an aqueous $CO_2$ absorbent and a metal chelate capable of capturing NO. In the absorber tower 2, the $SO_2$, $CO_2$ and $NO_x$ are absorbed from the feed stream 1 by the solvent 7. The rich solvent is then led to the regeneration tower, where the steam stripping removes the $CO_2$ from the $CO_2$ solvent. At the same time, the elevated temperature in the tower 20 and the reboiler 23 causes the regeneration reactions of the NO absorbent to proceed, consuming sulfite content of the solvent and producing molecular nitrogen and sulfate and dithionate anions. In the heat stable salt removal unit 12, the strong acid anions, including sulfite, are removed restoring the solvent alkanolamine into the free base form. The sodium hydroxide or other suitable alkali to form salts suitable for removal in the HSS removal unit or by crystallization may be added to the solvent at any convenient or advantageous point in the process, such as the stream 8 or stream 7.

The nitrogen dioxide ($NO_2$) which may be present in the feed stream 1 is readily absorbed by alkaline solutions. In solution, it seems to react to produce nitrogen, possibly by nitrosating sulfamic acid, produced by N,S product hydrolysis, to produce a primary amine N-nitroso compound, which decomposes to molecular nitrogen.

The heat stable removal in the unit 12 may be effected by any suitable means such as electrodialysis, ion exchange or low temperature crystallization. For the latter, caustic or other suitable alkali is added to the solvent, converting the amine heat stable salts to sodium salts, if a sodium alkali is used, and liberating the amine as the free base. The sodium sulfate and dithionate precipitate preferentially from the solution. The solvent is then again returned into the form active for the capture of $CO_2$, $SO_2$ and $NO_x$.

The solvent composition for this embodiment is similar to that for $CO_2$ removal only but with the addition of an iron chelate capable of capturing $NO_x$. It will be appreciated that the metal chelate could be added to treat a feed gas containing $CO_2$ and $NO_x$ and no, or essentially no $SO_2$.

If the feed gas stream has a large excess of $SO_2$ over that required for the $DeNO_x$ regeneration reactions (eg. the denitrosation of the metal chelate and the reduction of any oxidized $Fe^{III}$ EDTA to $Fe^{II}$ EDTA), the feed gas stream may be treated for removal of $SO_x$, $NO_x$ and $CO_2$ by first removing the excess $SO_2$ (i.e. reducing the $SO_2$ concentration upstream of contact with the absorbent to a level sufficient equal to or less than that needed to provide the reagent requirement for the subsequent $DeNO_x$ reactions) by any means known in the art and then utilizing the $SO_x$, $NO_x$, and $CO_2$ removal process described herein. The required amount of $SO_2$ for performing the $DeNO_x$ regeneration reactions may be allowed to remain in the gas treated for $SO_2$ removal, by adjusting the efficiency of the $SO_2$ capture in the upstream process. Alternatively, essentially all of the $SO_2$ may be removed in a first step and the reagent requirement of the $DeNO_x$ reactions being provided by addition of suitable chemicals to the $NO_x$ and $CO_2$ removal circuit.

The choice of $CO_2$ absorbent has a major influence on the total energy consumption for the operation of the capture process. Once that choice has been made, engineering options for the process design can further substantially influence the energy consumption. A number of energy saving designs are described in the prior art literature:

(1) Use of a split flow absorber, fed with a lean absorbent produced by normal steam stripping at the top and fed part way down the absorber with a semi-lean absorbent, produced by a low pressure, somewhat elevated temperature flash of the rich solvent.

(2) Use of a split flow absorber and regenerator as described by Kohl and Nielsen in "Gas Purification", A. Kohl and R. Nielsen, Eds., Fifth Ed., (1997), Gulf Publishing Company, p. 59.

(3) Strip at higher pressure, and therefore temperature, since the vapor pressure of $CO_2$ over the rich solution tends to increase faster than the water vapor pressure.

(4) Use multiple effect stripper configuration, where the overhead vapors in one effect are used to provide the heat for another effect operating at a lower pressure, i.e. temperature.

(5) Use of mechanical vapor recompression to raise the temperature of the steam/$CO_2$ vapor stream flowing out from the absorber and then flowing the hot vapors through the reboiler tubes to cause boiling of the solvent in the reboiler. The steam is partially condensed by the heat transfer. The two phase mixture is further cooled in a heat exchanger to condense more steam. The condensed water is separated in a reflux accumulator vessel and returned to the regeneration column, preferably at the feed tray, to help maintain the water balance of the solvent.

In accordance with another aspect of the instant invention, a novel method of increasing energy efficiency is possible when performing steam regenerable $SO_2$ removal followed by steam regenerable $CO_2$ capture. Here there is the possibility of heat integrating the two solvent steam regeneration steps in order to save energy. The regeneration pressure and temperature of the $SO_2$ solvent are limited to a maxima of about 50 kPa and 110° C. respectively by the tendency of the $SO_2$ to undergo a disproportionation reaction at higher temperatures:

$$3SO_2 + 2H_2O \Rightarrow 2H_2SO_4 + S \qquad (9)$$

Figure 3:
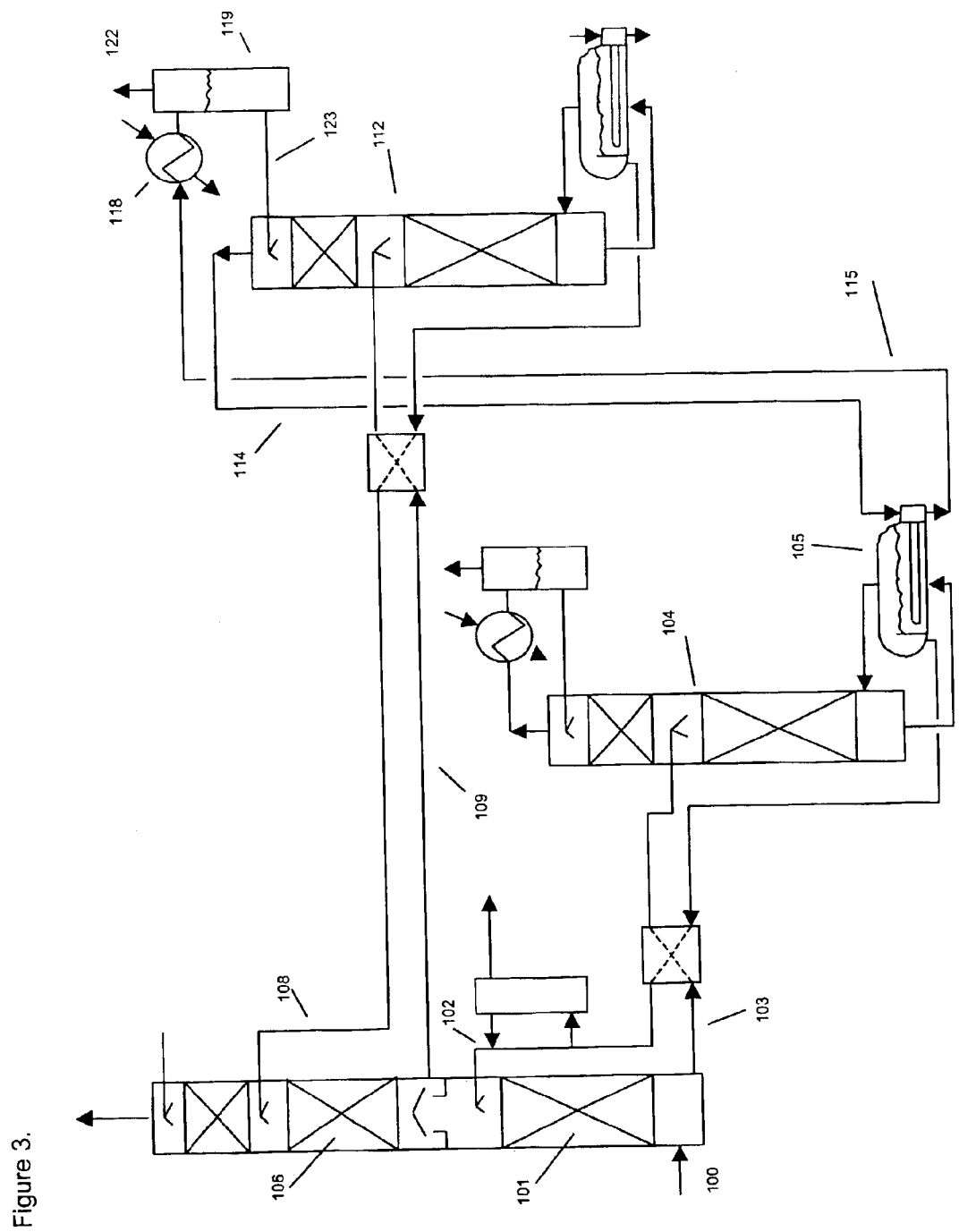

The regeneration of $CO_2$ does not have a similar constraint, so the $CO_2$ solvent may be regenerated at a higher temperature. This will then enable the use of the hotter overhead vapor from $CO_2$ regeneration to be used as the heat source for generating stripping steam in the $SO_2$ regeneration. The condensate generated is then put back as reflux into the $CO_2$ column. FIG. 3 illustrates the energy saving coupling of the $SO_2$ and $CO_2$ regeneration steps. A feed gas comprising $SO_2$ and $CO_2$ enters a scrubbing tower and is first reduced in $SO_2$ concentration by countercurrent contact with a steam regenerable $SO_2$ absorbing solution 102 in the gas-liquid contact section 101, producing an $SO_2$-rich solvent 103.

The feed gas then flows through gas-liquid contact section 106 countercurrent to a steam regenerable $CO_2$ solvent 108, producing a $CO_2$-rich solvent 109 which is fed to the steam regeneration tower 112, all in a manner similar to the embodiment illustrated in FIG. 1.

The steam and $CO_2$ vapors exiting the top of tower 112 as stream 114 flows to the tube side of the shell-and-tube reboiler 105 which generates the steam for the $SO_2$ regeneration tower 104. The vapors and condensed steam of stream 114 then flow through an optional condenser 118 into a gas-liquid separator 119. The gaseous product $CO_2$ flows out from the separator 119 as stream 122 and the steam condensate is optionally returned to the tower 112 as stream 123 in order to maintain water balance in the $CO_2$ absorbent.

Tower 112 is operated at a pressure higher than tower 104, e.g. at a pressure up to 80 psia (about 300° F.), more preferably up to 65 psia (about 280° F.) and most preferably up to about 60 psia (about 275° F.). This causes the operating temperature of the tower and the overhead stream 114 to be hotter than the operating temperature, i.e. the boiling temperature, of tower 104. Tower 104 is operated at a pressure of up to 40 psia (about 240° F.), more preferably up to 35 psia (about 230° F.) and most preferably up to 30 psia (about 214° F.). Thus, the stream 114 is able to transfer heat to the $SO_2$ solvent in the reboiler 105, causing boiling and the generation of steam for regenerating the solvent 103. If stream 114 is not able to provide sufficient heat for complete regeneration of solvent 103, additional heat may be provided by an additional steam coil supplied with steam from a boiler.

EXAMPLES

Example 1

Amine solutions were tested for ability to dissolve $CO_2$ by sparging 2 molar aqueous solutions of the amine with pure $CO_2$ through a fritted glass disperser. The amine sample was held at constant temperature (either 25° C. or 50° C.) until the weight of the sample remained constant. The $CO_2$ concentration was calculated as moles of $CO_2$ per mole of amine. The data are presented in Table 2.

Example 2

Absorbents were tested in a laboratory scale pilot apparatus, using a synthetic mixture of gases obtained by mixing mass flow controlled streams of the individual pure gases from gas cylinders. The test apparatus consisted of an 1 inch outer diameter glass absorbing tower containing a 12 inch bed of wire mesh saddles. The test absorbents were pumped to the absorbing tower by a variable speed metering pump. The absorbent at the bottom of the tower collected in a flask immersed in a thermostated bath set at 60° C. The bottom sump liquid level was controlled by means of another variable speed metering pump, which pumped the rich solvent to the top of a 5 sieve tray regeneration tower. The bottom sump of the regeneration tower was immersed in another thermostated bath, set at about 130° C., which then provided the stripping steam. An overhead condenser condensed most of the water vapor in the overhead stream of $CO_2$ and steam and returned the water to the regeneration tower, in order to maintain water balance in the solvent. The results are given in Table 4.

Example 3

The apparatus of Example 2 was used to test the simultaneous removal of $CO_2$ and nitric oxide, NO. The absorbent liquid was 3 molar in triethanolamine, 0.05 molar in FeEDTA and containing 2% sodium sulfite, with the balance being water. The feed gas flow of 1.9 liters per minute contained 9% vol. $CO_2$ and 360 ppmv of NO, with the balance nitrogen. Analysis for NO was performed with a non-dispersive infrared gas analyzer and $CO_2$ was determined with Gastec detector tubes. An absorbent flow rate of 15 ml/minute was used. The absorber tower bottom was thermostated to 60° C. and the regenerator bottom sump was held at about 100° C. The absorber pressure was equal to ambient. The test was run for 5 hours. The NO and $CO_2$ removal remained essentially constant during the At the end, the outlet NO concentration was 17 ppmv for a removal of 95%. The outlet $CO_2$ was 5%, for a removal of 44%.

TABLE 1

Tertiary Amines for $CO_2$ Capture

| Compound | Molecular Weight | pK$_a$ |
|---|---|---|
| N-methyldiethanolamine (MDEA) | 119d | 8.5 |
| N,N'-di-(2-hydroxyethyl)piperazine (DIHEP) | 174 | 7.7 |
| N,N'-di-(3-hydroxypropyl)piperazine | 202 | 8.2[1] |
| N,N,N',N'-tetrakis-(2-hydroxyethyl)-1,6-hexanediamine | 294 | 8.0 |
| N,N,N',N'-tetrakis-(2-hydroxypropyl)-1,6-hexanediamine | 322 | 8.5[1] |
| 4-(2-hydroxyethyl)-1-piperazineethanesulfonic acid | 238 | 7.5 |
| 4-(2-hydroxyethyl)-1-piperazinepropanesulfonic acid | 252 | 8.0 |
| 4-(2-hydroxyethyl)-1-piperazinebutanesulfonic acid | 266 | 8.3 |
| 4-(2-hydroxyethyl)piperazine-1-(2-hydroxypropanesulfonic acid) | 268 | 7.8 |
| 1,4-piperazinedi(ethanesulfonic acid) | 302 | 6.8 |
| Triethanolamine | 149 | 7.8 |

Notes:
[1]Indicates an value estimated from structure-property correlations.

TABLE 2

Examples of Low Energy Buffers for $CO_2$ Capture

| Buffer | $CO_2$ Loading[1], mol/mol | |
|---|---|---|
| | 25° C. | 50° C. |
| 95% N-methyldiethanolamine + 5% piperazine | | 0.7 |
| 92% N,N'-di-(2-hydroxyethyl)piperazine + 5% N-(2-hydroxyethyl)piperazine | 0.75 | 0.55 |
| 92% wt. N,N'-di-(3-hydroxypropyl)piperazine + 5% wt. N-(3-hydroxypropyl)piperazine | | |
| N,N,N',N'-tetrakis(2-hydroxyethyl)-1,6-hexanediamine | | |
| N,N,N',N'-tetrakis(2-hydroxypropyl)-1,6-hexanediamine | | |
| 4-(2-hydroxyethyl)-1-piperazineethanesulfonic acid | 0.5 | 0.4 |
| 1-piperazineethanesulfonic acid | | |
| 4-(2-hydroxyethyl)-1-piperazinepropanesulfonic acid | | |
| 4-(2-hydroxyethyl)-1-piperazinebutanesulfonic acid | | |
| 4-(2-hydroxyethyl)piperazine-1-(2-hydroxypropanesulfonic acid) | | |
| 1,4-piperazinedi(ethanesulfonic acid) | | |
| Triethanolamine | 0.40[4] | |

Notes
[2]Loading in moles $CO_2$/mole of absorbent, saturated with pure $CO_2$ at the indicated temperature; tested as 2 molar solution in water.
[3]Vapor pressure of buffer reagent without water.
[4]Loading for 5M TEA (68% wt). At 32% wt., loading is about 0.65 m/m.

TABLE 3

Vapor Pressure of Pure Amines

| Buffer | Molecular Wt. | $pK_a$ | Vapor Pressure |
|---|---|---|---|
| Monoethanolamine | 61 | 9.5 | 120 mm @ 120° C. |
| N-methyldiethanolamine | 117 | 8.5 | 6 mm @ 120° C. |
| Piperazine | 86 | 9.8 | 310 mm @ 120° C. |
| N-(2-hydroxyethyl)piperazine | 130 | 9 | 12 mm @ 120° C. |
| N-N'-di-(2-hydroxyethyl)piperazine | 172 | 7.7 | 0.55 mm @ 120° C. |
| Triethanolamine | 149 | 7.8 | 0.13 mm @ 120° C. |

TABLE 4

Pilot Plant $CO_2$ Capture Tests

| | | Absorbent 1 | Absorbent 2 | Absorbent 3 | Absorbent 4 | Absorbent 5 |
|---|---|---|---|---|---|---|
| Feed Gas Flow | ml/min | 2000 | 2000 | 1000 | 2000 | 2000 |
| $O_2$ | Vol. % | 2.8 | 3.1 | 0 | 3.1 | 3.1 |
| Absorber temperature | ° C. | 60 | 60 | 60 | 60 | 60 |
| Regenerator bath | ° C. | 113 | 120 | 120 | 115 | 115 |
| Amine in regenerator | ° C. | 98 | 101 | 101 | 101 | 101 |
| Total amine concentration | mole/l | 2.68 | 2.52 | 2.52 | 2.98 | 2.82 |
| Absorbent flow | ml/min | 15 | 15 | 7.5 | 15 | 15 |
| Amine flow | mm/min | 40.2 | 37.8 | 18.9 | 44.7 | 42.3 |
| $CO_2$ In | % | 12 | 9 | 9 | 9 | 9 |
| $CO_2$ Out | % | 6 | 6.5 | 6 | 4 | 2.5 |
| $CO_2$ removed | mm/min | 5.36 | 2.2 | 1.34 | 4.5 | 5.8 |
| Rich Loading, $CO_2$/amine | m/m | 0.13 | 0.06 | 0.07 | 0.10 | 0.14 |
| Lean Absorbent pH | | 9.6 | 10.0 | 10.3 | 9.84 | 9.74 |
| Rich Absorbent pH | | 9.0 | 6.5 | 8.8 | 9.0 | 9.1 |

Absorbent 1. 250 g/l MDEA + 50 g/l piperazine.
Absorbent 2. 397 g/l DIHEP + 21.6 g/l HEP.
Absorbent 3. 397 g/l DIHEP + 21.6 g/l HEP.
Absorbent 4. 373 g/l DIHEP + 20.3 g/l HEP + 50 g/l piperazine.
Absorbent 5. 207 g/l DIHEP + 211 g/l HEP It will be appreciated by those skilled in the art that various modifications and additions may be made to the processes disclosed herein and all of these are within the scope of the following claims.

What is claimed is:

1. A process for recovering $CO_2$ from a feed gas stream comprising treating the feed gas stream with a regenerated absorbent comprising at least one tertiary amine absorbent having a $pK_a$ for the amino function of from about 6.5 to about 9 in the presence of an oxidation inhibitor to obtain a $CO_2$ rich stream, maintaining a sufficient oxidation inhibitor concentration in the absorbent to essentially prevent the oxidation of the absorbent by molecular oxygen and subsequently treating the $CO_2$ rich stream to obtain the regenerated absorbent and a $CO_2$ rich product stream.

2. The process as claimed in claim 1 wherein the process further comprises selecting the at least one tertiary amine absorbent from the group consisting of methyldiethanolamine, triethanolamine, N,N'-di-(hydroxyalkyl)piperazine, N,N,N',N'-tetrakis(hydroxyalkyl)-1,6-hexanediamine, tertiary alkylamine sulfonic acids and mixtures thereof.

3. The process as claimed in claim 1 wherein the process further comprises selecting the at least one tertiary amine absorbent from the group consisting of methyldiethanolamine, N,N'-di-(2-hydroxyethyl)piperazine, N,N'-di-(3-hydroxypropyl)piperazine, N,N,N',N'-tetrakis(2-hydroxyethly)-1,6-hexanediamine, N,N,N',N'-tetrakis(2-hydroxypropyl)-1,6-hexanediamine, tertiary alkylamine sulfonic acids, triethanolamine, and mixtures thereof.

4. The process as claimed in claim 3 wherein the tertiary alkylamine sulfonic acid is selected from the group consisting of 4-(2-hydroxyethyl)-1-piperazineethanesulfonic acid, 4-(2-hydroxyethyl)-1-piperazinepropanesulfonic acid, 4-(2-hydroxyethyl)-1-piperazinebutanesulfonic acid, 4-(2-hydroxyethyl)piperazine-1-(2-hydroxypropanesulfonic acid), 1,4-piperazinedi(ethanesulfonic acid) and mixtures thereof.

5. The process as claimed in claim 1 wherein the process further comprises selecting the tertiary amine absorbent such that it has a vapour pressure less than about 1 mm Hg at 120° C. as the pure compound.

6. The process as claimed in claim 1 wherein the absorbent further comprises at least one secondary amine.

7. The process as claimed in claim 6 further comprising selecting at least one piperazine as the secondary amine.

8. The process as claimed in claim 6 wherein the at least one secondary amine is selected from the group consisting of piperazine, N-(2-hydroxyethyl)piperazine and an N-(hydroxypropyl)piperazine and mixtures thereof.

9. The process as claimed in claim 6 wherein the at least one secondary amine is selected from the group consisting of piperazine, N-(2-hydroxyethyl)piperazine and mixtures thereof.

10. The process as claimed in claim 6 wherein the absorbent comprises an aqueous solution comprising 10–50 wt % of the tertiary amine and 1–40 wt % of a secondary amine.

11. The process as claimed in claim 6 wherein the absorbent comprises 10–50 wt % of the tertiary amine, 0–8 wt % of piperazine, 1–30 wt % of N-(2-hydroxyethyl) piperazine with the remainder comprising water.

12. The process as claimed in claim 1 wherein the $CO_2$ rich stream is treated with steam to regenerate the absorbent.

13. The process as claimed in claim 1 further comprising removing only a portion of the heat stable salts from the absorbent.

14. The process as claimed in claim 1 in which the oxidation inhibitor comprises a free radical scavenger.

15. The process as claimed in claim 14 wherein the process further comprises selecting an alcohol, alkanolamine, thiosulfate and mixtures thereof as the free radical scavenger.

16. The process as claimed in claim 14 wherein the process further comprises selecting thiosulfate as the free radical scavenger.

17. The process as claimed in claim 1 wherein the process further comprises selecting at least one phenolic amine antioxidant or aromatic amine antioxidant as the free radical scavenger.

18. The process as claimed in claim 1 in which the oxidation inhibitor comprises an oxygen scavenger.

19. The process as claimed in claim 18 wherein the process further comprises selecting sulfite or bisulfite as the oxygen scavenger.

20. The process as claimed in claim 1 in which the oxidation inhibitor comprises a mixture of at least one oxygen scavenger and at least one free radical scavenger.

21. The process as claimed in claim 1 further comprising treating the regenerated absorbent to comprise greater than 0.05 wt. % thiosulfate.

22. The process as claimed in claim 1 further comprising adding a chelating agent to reduce metal ion catalyzed oxidation of the absorbent.

23. The process as claimed in claim 1 further comprising subjecting the absorbent to an ion exchange step to remove multivalent metal ions to reduce metal ion catalyzed oxidation of the absorbent.

24. The process as claimed in claim 1 wherein the absorbent is in solution and the process further comprises increasing the concentration of absorbent or salts in the solution to reduce the solubility of $O_2$ in the solution.

25. The process as claimed in claim 1 wherein the feed gas stream further comprises $NO_x$ and the process further comprises treating the feed gas stream to remove at least a portion of the $NO_x$.

26. The process as claimed in claim 1 wherein the feed gas stream further comprises $NO_x$ and the process further comprises providing a reagent to react with the $NO_x$ to produce reaction products comprising molecular nitrogen, sulfonated ammonia chemicals, and sulfate and/or dithionate ions, treating the $CO_2$ rich stream to remove sulfate and/or dithionate ions and regenerate the reagent and adjusting the pH of the regenerated absorbent from about 7 to about 9.5.

27. The process as claimed in claim 26 further comprising selecting the reagents from the group consisting of a metal chelate, sulfite and mixtures thereof.

28. The process as claimed in claim 27 further comprising selecting the metal chelate from the group consisting of iron nitrilotriacetic acid, iron ethylenediaminetetraacetic acid, iron diethylenetriaminepentaacetic acid and mixtures thereof.

29. A process for recovering $SO_2$ and $CO_2$ from a feed gas stream comprising:
(a) treating the feed gas stream in an $SO_2$ scrubbing loop with a first absorbent stream to obtain a $SO_2$ rich stream and a $SO_2$ lean stream and subsequently treating the $SO_2$ rich stream to obtain a first regenerated absorbent stream which is used in the $SO_2$ scrubbing loop;
(b) treating the $SO_2$ lean stream in a $CO_2$ scrubbing loop with a second absorbent stream to obtain a $CO_2$ rich stream and subsequently treating the $CO_2$ rich stream to obtain a second regenerated absorbent stream which is used in the $CO_2$ scrubbing loop; and,
(c) treating at least a potion of one or both of the first and second regenerated absorbent streams to remove heat stable salts wherein the absorbent used in each of the scrubbing loops comprises at least one tertiary amine and at least one secondary amine as an activator.

30. The process as claimed in claim 29 further comprising selecting the tertiary amine from N,N'-di-(2-hydroxyethyl) piperazine, N,N'-di-(3-hydroxypropyl)piperazine, N,N,N', N'-tetrakis(2-hydroxypropyl)-1,6-hexanediamine or mixtures thereof, and selecting the secondary amine from N-2-hydroxyethylpiperazine, piperazine, a N-(hydroxypropyl) piperazine or mixtures thereof as an activator.

31. The process as claimed in claim 29 wherein only the first regenerated absorbent stream is treated to remove heat stable salts and a bleed stream of the treated amine is bled into the $CO_2$ removal loop and a bleed steam from the $CO_2$ scrubbing loop is provided to the SO2 scrubbing loop.

32. The process as claimed in claim 29 further comprising adjusting the treatment of the feed gas stream in the $SO_2$ scrubbing loop such that the $SO_2$ lean gas stream has a concentration of $SO_2$ so as to maintain a concentration of sulfite in the $CO_2$ scrubbing loop sufficient to essentially prevent the oxidation of the absorbent by molecular oxygen.

33. The process as claimed in claim 29 wherein the feed gas stream further comprises $NO_x$ and the process further comprises providing a metal chelate to react with the $NO_x$ to produce sulfate and/or dithionate ions, treating the $CO_2$ rich stream to remove sulfate and/or dithionate ions and regenerate the reagent and adjusting the pH of the second regenerated absorbent from about 7 to about 9.5.

34. The process as claimed in claim 33 further comprising selecting the metal chelate from the group consisting of iron nitrilotriacetic acid, iron ethylenediaminetetraacetic acid, iron diethylenetriaminepentaacetic acid and mixtures thereof.

35. The process as claimed in claim 29 further comprising conducting steps (a) and (b) in a single adsorption column.

36. The process as claimed in claim 29 further comprising selecting the same amines for each loop.

37. The process as claimed in claim 29 further comprising conducting step (a) at a pH in the range of about 3–6 and step (b) at a pH in the range of about 6–9.

38. A process for removal of $CO_2$ and $NO_x$ from a gas stream containing $SO_2$ at a mole ratio <5 times the $NO_x$ content, comprising treating the feed gas stream to obtain a $CO_2$ rich stream by exposing the feed gas stream to a regenerated absorbent comprising at least one tertiary amine absorbent having a $pK_a$ for the amino function of from about 6.5 to about 9, an oxidation inhibitor, a metal chelate and sulfite and or other reactants and reducing agents to react with the $NO_x$ to produce reaction products comprising molecular nitrogen, sulfonated ammonia chemicals, and sulfate and/or dithionate ions, treating the $CO_2$ rich stream to remove heat stable salts including sulfate and/or dithionate ions and adjusting the pH of the regenerated absorbent from about 7 to about 9.5 and subsequently treating the $CO_2$ rich stream to obtain the regenerated absorbent.

39. The process as claimed in claim 38 wherein the regenerated absorbent comprises greater than 0.5 wt. % sulfite, greater than 0.05 wt. % thiosulfate and greater than 0.005 molar FeEDTA.

40. The process as claimed in claim 39 wherein the regenerated absorbent has a pH in the range 6–9.5.

41. The process as claimed in claim 40 wherein the regenerated absorbent has a pH in the range 7–9.5 and the maximum concentrations of the metal chelate and sulfite and/or other reactants and reducing agents are each equal to their solubility limit at 20° C.

42. A process for recovering $SO_2$ and $CO_2$ from a feed gas stream comprising:

(a) subjecting the feed gas stream to a $SO_2$ removal step using a $SO_2$ absorbent and recovering a $SO_2$ lean stream and a $SO_2$ rich absorbent stream;

(b) regenerating the $SO_2$ absorbent at a first temperature to obtain a regenerated $SO_2$ absorbent stream and a first vapour stream;

(c) subjecting the $SO_2$ lean stream to a $CO_2$ removal step using a $CO_2$ absorbent and recovering a $CO_2$ lean stream and a $CO_2$ rich absorbent stream;

(d) regenerating the $CO_2$ absorbent at a second temperature to obtain a regenerated $CO_2$ absorbent stream and a second vapour stream wherein the first temperature is lower than the second temperature so that at least a portion of the second vapour stream is used to regenerate the $SO_2$ absorbent.

43. The process as claimed in claim 42 wherein the $SO_2$ absorbent is regenerated by steam produced in a reboiler and at least a portion of the second vapour stream is used to provide heat to the reboiler.

44. The process as claimed in claim 43 wherein the second vapour stream is used to indirectly heat to the reboiler and is subsequently returned to be used in the regeneration of the $CO_2$ absorbent.

* * * * *